(12) United States Patent
Lee

(10) Patent No.: US 8,619,910 B1
(45) Date of Patent: Dec. 31, 2013

(54) DECISION FEEDBACK EQUALIZATION FOR MIMO SYSTEMS WITH HYBRID ARQ

(75) Inventor: Jungwon Lee, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 777 days.

(21) Appl. No.: 12/101,582

(22) Filed: Apr. 11, 2008

Related U.S. Application Data

(60) Provisional application No. 60/911,151, filed on Apr. 11, 2007.

(51) Int. Cl.
*H03K 9/00* (2006.01)
*H04L 27/00* (2006.01)

(52) U.S. Cl.
USPC ........... 375/316; 375/260; 375/262; 375/267; 375/340; 375/341; 455/101; 455/132; 455/500; 455/562.1; 370/334

(58) Field of Classification Search
USPC ............... 375/260, 262, 267, 316, 340, 341; 455/101, 132, 500, 562.1; 370/334
See application file for complete search history.

(56) References Cited

U.S. PATENT DOCUMENTS

| | | | |
|---|---|---|---|
| 6,185,258 B1 | 2/2001 | Alamouti | |
| 6,567,388 B1 | 5/2003 | Tomcik et al. | |
| 6,687,492 B1 | 2/2004 | Sugar et al. | |
| 6,778,619 B2 | 8/2004 | Zangi et al. | |
| 6,868,520 B1 | 3/2005 | Fauconnier | |
| 6,892,341 B2 | 5/2005 | Golitschek et al. | |
| 6,967,598 B2 | 11/2005 | Mills | |
| 7,031,419 B2 | 4/2006 | Piirainen | |
| 7,194,237 B2 | 3/2007 | Sugar et al. | |
| 7,295,624 B2* | 11/2007 | Onggosanusi et al. | 375/267 |
| 7,308,026 B2* | 12/2007 | Purho | 375/233 |
| 7,308,047 B2 | 12/2007 | Sadowsky | |
| 7,362,815 B2 | 4/2008 | Lindskog et al. | |
| 7,366,247 B2 | 4/2008 | Kim et al. | |
| 7,382,841 B2 | 6/2008 | Ohtaki et al. | |
| 7,386,079 B2* | 6/2008 | Skog et al. | 375/354 |
| 7,428,269 B2 | 9/2008 | Sampath | |
| 7,489,746 B1 | 2/2009 | Awater et al. | |
| 7,502,432 B2 | 3/2009 | Catreux et al. | |
| 7,526,038 B2 | 4/2009 | McNamara | |

(Continued)

FOREIGN PATENT DOCUMENTS

| | | |
|---|---|---|
| EP | 1 271 835 | 1/2003 |
| EP | 1 501 210 | 1/2005 |

(Continued)

OTHER PUBLICATIONS

Ginis, G. et al., "On the Relation Between V-BLAST and the GDFE", Sep. 2001, IEEE Communication Letters, vol. 5, pp. 364-366.*

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.*

Cioffi et al., "Generalized decision-feedback equalization for packet transmission with ISI and gaussian noise," *Communications, computation, control and signal processing: a tribute to Thomas Kailath*, Chapter 4, pp. 79-127 (1997).

(Continued)

*Primary Examiner* — Shuwang Liu
*Assistant Examiner* — Sung Ahn

(57) ABSTRACT

Systems and methods are provided for decision feedback equalization (DFE) in multiple-input multiple-output (MIMO) systems with hybrid automatic repeat request (HARQ). Using a pre-equalization approach, the receiver combines received vectors by vector concatenation before equalization using DFE. Using a post-equalization approach, the receiver equalizes received vectors using DFE before combining the vectors. Cholesky factorization and QR decomposition may be used for DFE.

31 Claims, 18 Drawing Sheets

1100

(56) References Cited

U.S. PATENT DOCUMENTS

| | | | |
|---|---|---|---|
| 7,539,274 | B2 | 5/2009 | Catreux et al. |
| 7,548,592 | B2 | 6/2009 | Wight |
| 7,554,985 | B2 | 6/2009 | Ihm et al. |
| 7,567,583 | B2 | 7/2009 | Miyoshi |
| 7,573,806 | B2 | 8/2009 | Ihm et al. |
| 7,590,204 | B2 | 9/2009 | Monsen |
| 7,593,489 | B2 | 9/2009 | Koshy et al. |
| 7,649,953 | B2 | 1/2010 | Bauch |
| 7,693,551 | B2* | 4/2010 | Ojard .................. 455/562.1 |
| 7,729,411 | B2 | 6/2010 | Wang et al. |
| 7,742,550 | B2 | 6/2010 | Olesen et al. |
| 7,751,506 | B2 | 7/2010 | Niu et al. |
| 7,782,971 | B2 | 8/2010 | Burg et al. |
| 7,826,557 | B2 | 11/2010 | Li et al. |
| 7,885,364 | B2 | 2/2011 | Ito |
| 8,085,738 | B2 | 12/2011 | Park et al. |
| 2003/0185295 | A1* | 10/2003 | Yousef ........................ 375/233 |
| 2004/0181419 | A1 | 9/2004 | Davis et al. |
| 2005/0226239 | A1 | 10/2005 | Nishida et al. |
| 2006/0107167 | A1 | 5/2006 | Jeong et al. |
| 2006/0165192 | A1* | 7/2006 | Ito ............................. 375/267 |
| 2006/0251156 | A1 | 11/2006 | Grant et al. |
| 2006/0274836 | A1 | 12/2006 | Sampath et al. |
| 2007/0155433 | A1* | 7/2007 | Ito et al. ................... 455/562.1 |
| 2007/0206531 | A1 | 9/2007 | Pajukoski et al. |
| 2007/0254662 | A1 | 11/2007 | Khan et al. |
| 2007/0268988 | A1 | 11/2007 | Hedayat et al. |
| 2007/0291882 | A1* | 12/2007 | Park et al. ................. 375/347 |
| 2008/0025427 | A1 | 1/2008 | Lee et al. |
| 2008/0025429 | A1 | 1/2008 | Lee et al. |
| 2008/0025443 | A1 | 1/2008 | Lee et al. |
| 2008/0037670 | A1 | 2/2008 | Lee et al. |
| 2008/0049865 | A1* | 2/2008 | Blankenship et al. ......... 375/295 |
| 2008/0063103 | A1 | 3/2008 | Lee et al. |
| 2008/0144733 | A1 | 6/2008 | ElGamal et al. |
| 2008/0159375 | A1* | 7/2008 | Park et al. ................. 375/233 |
| 2008/0198941 | A1 | 8/2008 | Song et al. |
| 2009/0031183 | A1 | 1/2009 | Hoshino et al. |
| 2009/0080579 | A1 | 3/2009 | Fujii |
| 2009/0307558 | A1 | 12/2009 | Lee et al. |
| 2010/0014601 | A1 | 1/2010 | Mo et al. |

FOREIGN PATENT DOCUMENTS

| | | |
|---|---|---|
| EP | 1608081 | 12/2005 |
| WO | WO 00/52873 | 8/2000 |
| WO | WO 02/067491 | 8/2002 |

OTHER PUBLICATIONS

Ginis et al., "On the relation between V-BLAST and the GDFE," *IEEE Communications Letters*, 5:364-366 (2001).

Hassibi, "An efficient square-root algorithm for blast," IEEE International Conference on Acoustics, Speech, and Signal Processing, 2:II737-II740 (2000).

Onggosanusi, et al., "Hybrid ARQ transmission and combining for MIMO systems," IEEE International Conference on Communications, 2003, 5:3205-3209 (2003).

Wolniansky, "V-BLAST: An architecture for realizing very high data rates over the rich-scattering wireless channel," URSI International Symposium on Signals, Systems, and Electronics, 1998, pp. 295-300 (1998).

Wübben et al., "MMSE extension of V-BLAST based on sorted QR decomposition," IEEE 58th Vehicular Technology Conference, 2003, 1:508-512 (2003).

802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands (Feb. 2006).

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Alamouti, Siavash M. "A Simple Transmit Diversity Technique for Wireless Communications." IEEE Journal on Select Areas in Communications, vol. 16, No. 8 (Oct. 1998).

Arkhipov, Alexander et al. "OFDMA-CDM performance enhancement H-ARQ and interference cancellation" IEEE Journal on Selected Areas in Communications, vol. 24, pp. 1199-1207 (Jun. 2006).

Chase, David. "Code Combining—A Maximum-Likelihood Decoding Approach for Combining an Arbitrary Number of Noisy Packets" IEEE Transactions on Communications, vol. Comm-33 No. 5, pp. 385-393 (May 1985).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Davis, Linda M. "Scaled and decoupled Cholesky and QR decompositions with application to spherical MIMO detection" IEEE Wireless Communications and Networking, vol. 1, pp. 326-331 (2003).

Dekorsy, Armin "A cutoff rate based cross-layer metric for MIMO-HARQ transmission" IEEE 16th International Symposium on Personal, Indoor and Mobile Radio Communications, vol. 4, pp. 2166-2170 (2005).

Gharavi-Alkhansari, Mohammad et al. "Constellation Space Invariance of Space-Time Block Codes with Application to Optimal Antenna Subset Selection" 4th IEEE Workshop on Signal Processing Advances in Wireless Communications, pp. 269-273 (2003).

Jang et al. "An Efficient Symbol-Level Combining Scheme for MIMO Systems With Hybrid ARQ", IEEE Transactions on Wireless Communications, vol. 8, pp. 2443-2451, May 26, 2009.

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Krishnaswamy, Dilip, et al. "Multi-Level Weighted Combining of Retransmitted Vectors in Wireless Communications." IEEE VTC (Sep. 2006).

Liu, Peng et al. "A new efficient MIMO detection algorithm based on Cholesky decomposition," The 6th International Conference on Advanced Communication Technology, vol. 1, pp. 264-268 (2004).

Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

Nakajima, Akinori et al. "Throughput of turbo coded hybrid ARQ using single-carrier MIMO multiplexing" IEEE 61st Vehicular Technology Conference, vol. 1, pp. 610-614 (2005).

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Oh, Mi-Kyung et al. "Efficient hybrid ARQ with space-time coding and low-complexity decoding" IEEE Conference on Acoustics, Speechc, and Signal Processing, vol. 4, pp. 589-592 (2004).

Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Samra H; Zhi Ding "New MIMO ARQ protocols and joint detection via sphere decoding" IEEE Transactions on Signal Processing [online] Feb. 28, 2006, pp. 473-4822.

Samra Harvind, Ding Zhi "Sphere decoding for retransmission diversity in MIMO flat-fading channels" ICASSP IEEE Int. Conf. Acoust. Speech Signal Process [online], pp. 585-588 (May 17, 2004).

Schmitt M.P. "Improved retransmission strategy for hybrid ARQ schemes employing TCM" Wireless Communications and Networking Conference, 1999 IEEE New Orleans, LA, pp. 1226-1228 (Sep. 21, 1999).

(56) References Cited

OTHER PUBLICATIONS

Theofilakos, Panagiotis et al. "Frobenius Norm Based Receive Antenna Subarray Formation for MIMO Systems" First European Conference on Antennas and Propagation, pp. 1-5 (2006).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. "Soft packet combing for STC re-transmission to improve H-ARQ performance in MIMO mode." Proposal for IEEE 802.16 Broadband Wireless Access Working Group, pp. 1-5 (Jul. 7, 2004).

Jang et al., "Optimal Combining Schemes for MIMO Systems with Hybrid ARQ", ISIT 2007, IEEE International Symposium, Jun. 24-Jun. 29, 2007, pp. 2286-2290.

Zhang, Y. et al. "MMSE Linear Detector for Space-Time Transmit Diversity over Fast Fading Channels", *The 14$^{th}$ IEEE 2003 International Symposium on Personal, Indoor and Mobile Radio Communication Proceedings*, pp. 2388-2392, 2003.

Zhou, S. et al., Subspace-Based (Semi-) Blind Channel Estimation for Block Precoded Space-Time OFDM, IEEE Transactions on Signal Processing, vol. 50, No. 5, May 2002, pp. 1215-1228.

\* cited by examiner $$\begin{pmatrix} y_1 \\ \vdots \\ y_{N_R} \end{pmatrix}_n = \begin{pmatrix} h_{11} & \cdots & h_{1N_T} \\ \vdots & \ddots & \vdots \\ h_{N_R1} & \cdots & h_{N_RN_T} \end{pmatrix}_n \begin{pmatrix} x_1 \\ \vdots \\ x_{N_T} \end{pmatrix} + \begin{pmatrix} z_1 \\ \vdots \\ z_{N_R} \end{pmatrix}_n$$

DECISION FEEDBACK EQUALIZATION FOR MIMO SYSTEMS WITH HYBRID ARQ

CROSS-REFERENCE TO RELATED APPLICATIONS

This application claims the benefit under 35 U.S.C. §119(e) of U.S. Provisional Application No. 60/911,151, filed Apr. 11, 2007, which is incorporated herein by reference in its entirety.

BACKGROUND

This invention relates to decision feedback equalization (DFE) for a multiple-input multiple-output (MIMO) data transmission or storage system with hybrid automatic repeat request (HARQ).

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect a signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors.

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). HARQ typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, the receiver first attempts FEC by decoding the error correction code. If, after error detection, there are still errors present, the receiver will request a retransmission of that packet. Otherwise, the receiver accepts the received vector.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions.

SUMMARY

Decision feedback equalization (DFE) for a multiple-input multiple-output (MIMO) data transmission or storage system with hybrid automatic repeat request (HARQ) is provided.

A MIMO transmitter, which has $N_T$ outputs, may send an $N_T$-dimensional signal vector to the receiver. The receiver, which has $N_R$ inputs, may receive an $N_R$-dimensional signal vector corresponding the $N_T$-dimensional transmit vector. Using a HARQ protocol the MIMO transmitter may send the same signal vector multiple times to the receiver. A DFE at the receiver may be used to recover the transmitted signal vector from the multiple received signal vectors.

In some embodiments, a pre-equalization combining DFE approach is used. In this approach, the receiver concatenates the received signal vectors into a combined received signal vector. Channel state information associated with each of the received signal vectors is also concatenated into combined channel state information. Decision feedback equalization is performed on the combined received signal vector using the combined channel state information. Cholesky factorization and QR decomposition may be used by the DFE to process the combined channel state information. An estimated transmitted signal vector may be determined based on the equalized signal vector. The DFE may be performed based on the concatenated received signal vectors and the concatenated channel state information in their entireties. The DFE may also be performed incrementally by combining each received signal vector and channel state information with channel and signal information from previous transmissions.

In some embodiments, a post-equalization combining DFE approach is used. In this approach, the receiver performs decision feedback equalization on each of the received signal vectors using the channel state information associated with each of the received signal vectors. After the signal vectors are equalized, they may be combined into a combined equalized signal vector. An estimated transmitted signal vector may be determined based on the combined equalized signal vector. Cholesky factorization and QR decomposition may be used by the DFE to process the combined channel state information.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 4 is a vector model of the system in FIG. 1;

DETAILED DESCRIPTION

Decision feedback equalization (DFE) for multiple-input multiple-output (MIMO) data transmission or storage system with hybrid automatic repeat request (HARQ) is provided.

In the following, $(\cdot)^T$ denotes transpose, whereas $(\cdot)^*$ denotes conjugate transpose. x denotes a column vector. A denotes a matrix. Depending on the context, 0 denotes either a zero vector or a matrix with all elements equal to zero.

Figure 1:
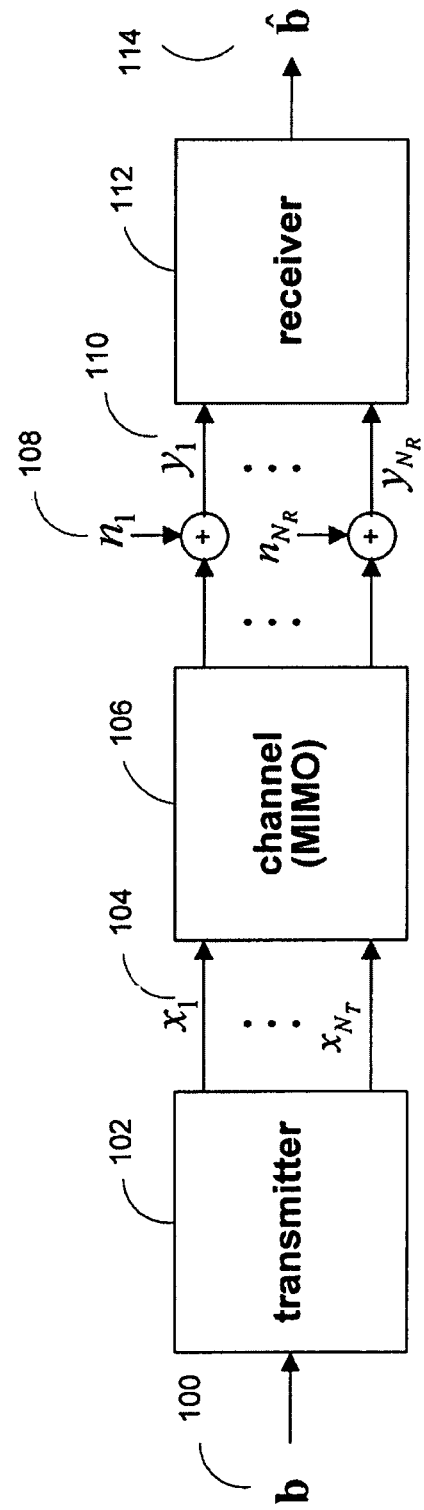
FIG. 1 is a high level block diagram of a multiple-input multiple-output data transmission or storage system.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_T$ outputs 104 and receiver 112 has $N_R$ inputs 110, so channel 106 is modeled as a multiple-input multiple-output (MIMO) system with $N_T$ inputs and $N_R$ outputs. The $N_T$ input and $N_R$ output dimensions may be implemented using multiple time, frequency, or spatial dimensions, or any combination of such dimensions. In some instances transmitter 102 may send the same transmitted signals multiple times following a hybrid automatic repeat request (HARQ) protocol.

Figure 2:
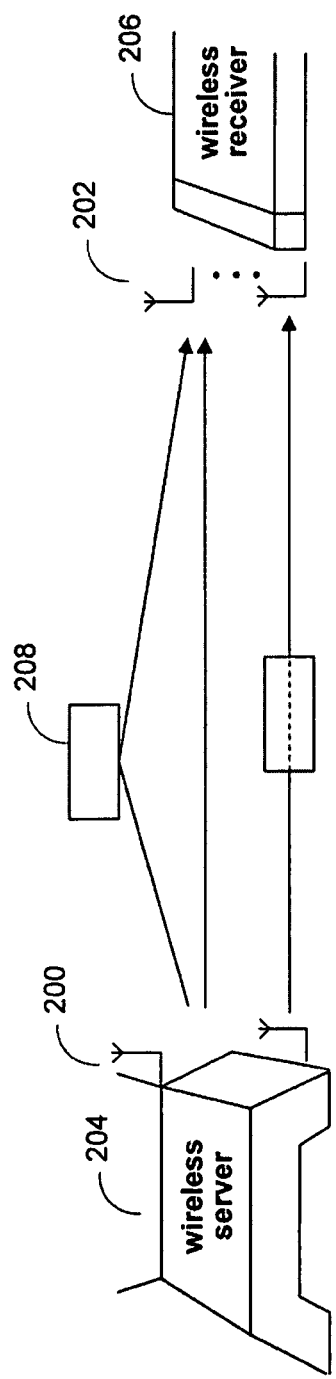
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
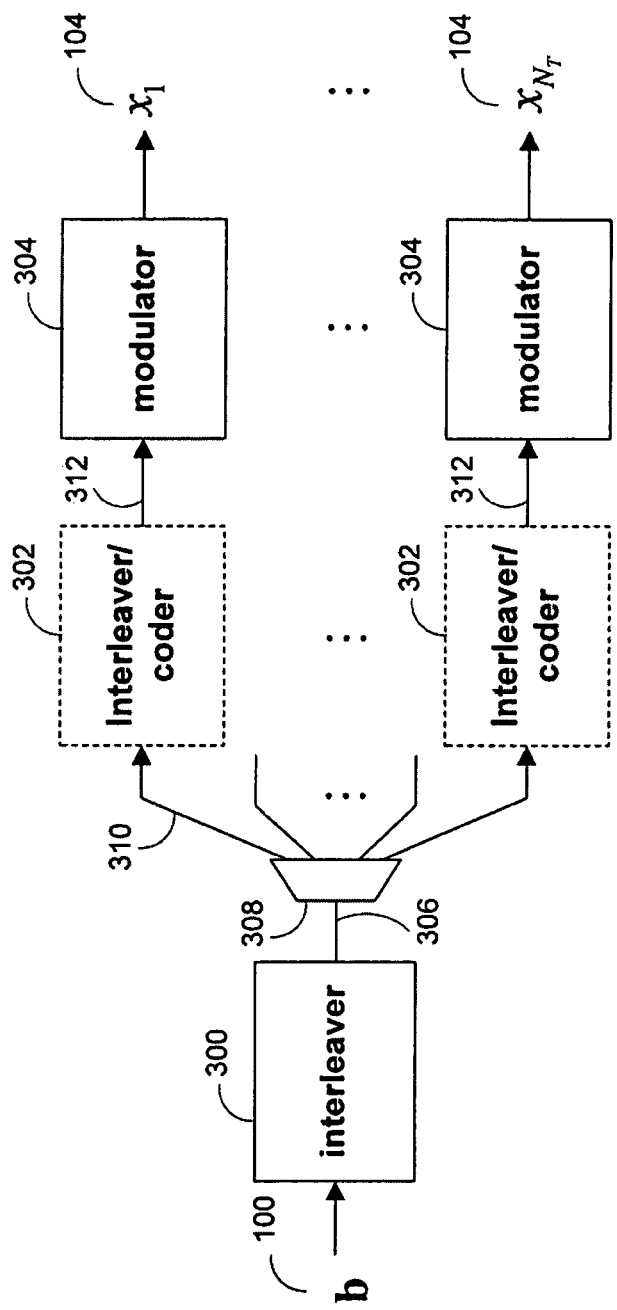
FIG. 3 is a block diagram of a transmitter in accordance with one embodiment of the invention.

One embodiment of transmitter 102 is shown in FIG. 3. Transmitter 102 converts bit sequence 100 into signals 104 appropriate for transmission through channel 106 (FIG. 1). Bit sequence 100 is passed through interleaver 300. Therefore, each bit in bit sequence 100 may be assumed to be independent of all other bits in bit sequence 100. Bit sequence 306 at the output of interleaver 300 is demultiplexed by demultiplexor 308 across $N_t$ paths. Each demultiplexed output 310 may or may not go through another interleaver and/or coding block 302, yielding bit sequences 312. Finally, bit sequences 312 are modulated with modulators 304, and are transmitted as signals $x_1, \ldots, x_{N_T}$, or x in column vector form.

Modulators 304 group the incoming bits into symbols, which are mapped and converted to signals according to a signal constellation set and carrier signal. In one embodiment, modulator 304 uses quadrature amplitude modulation (QAM). Each symbol is mapped to a signal point in the QAM signal constellation set, where the signal points are differentiated from one another by phase and/or magnitude.

Even though x is transmitted, receiver 112 in FIG. 1 actually receives $y_n$, where $$y_n = H_n x + z_n, 1 \leq n \leq K \quad (1)$$

For clarity, FIG. 4 shows the components of each vector in equation (1). Index n represents the n-th instance that the same transmitted vector, x, is transmitted. $y_n$ is an $N_R \times 1$ vector, where each vector component is the signal received by one of the $N_R$ inputs of receiver 112. $H_n$ 400 is an $N_R \times N_T$ channel state matrix that defines how channel 106 alters the transmitted vector, x. $Z_n$ is an $N_R \times 1$ vector of additive noise. Note that the characteristics of channel 106 (as reflected by channel state matrix $H_n$ 400) and noise $z_n$ 108 may be different for each instance n. Differences in channel state matrix $H_n$ 400 and noise $z_n$ 108 may arise because each transmission of x may occur at a different time or through a different medium. For example, flat channel fading may lead to channel differences between consecutive transmissions. It may be assumed, however, that channel state information $H_n$ for each transmission is available at the receiver while noise $z_n$ is unavailable. Channel state information $H_n$ may be determined or estimated using any suitable channel state estimation technique.

Noise may be modeled as additive white Gaussian noise (AWGN) sources. These noise sources may be independent and identically distributed (i.i.d). That is, the noise that affects one of the $N_R$ components in $z_n$ does not affect the noise for any other component in $z_n$. Also, all of the noise sources may have the same probabilistic characteristics. Furthermore, each component of $z_n$ may have zero mean and may be random in terms of both magnitude and phase, where the magnitude and the phase are also independent. A noise source that has all of these characteristics is called an i.i.d. zero mean circularly symmetric complex Gaussian (ZMCSCG) noise source. If the covariance of noise matrix $z_n$ is $\sigma_z^2 I N_R$, then the conditional probability distribution function (pdf) of the received signal, $f(y_n|H_n,x)$, is given by $$f(y_n \mid H_n, x) = \frac{1}{(\pi \sigma_x^2)^{N_R}} \exp\left\{-\frac{\|y_n - H_n x\|^2}{\sigma_x^2}\right\}. \tag{2}$$

Receiver 112 may use a decision feedback equalizer (DFE), as described in greater detail below, to determine the signal x that was transmitted based on the one or more received copies of $y_n$. As shown in equation (1) the same signal x may be retransmitted n-times until x can be determined from the received signals $y_n$. In some HARQ schemes, instead of retransmitting the same signal x, the transmitter may use precoding to form a different signal $x_n$ at each retransmission. In these schemes, the effect of the precoding can be included in channel matrix $H_n$ for each of the n transmissions of signal x. Then, $H_n$ is an effective channel matrix and the transmit signal x can be considered to be the information signal before preceding. Thus, equation (1) can also be used when precoding is used by the transmitter. Therefore it can be seen that the embodiments described herein may be used with HARQ schemes that use any suitable precoding techniques or with no precoding without affecting the overall operation of the system.

After the n-th transmission of signal x, all of the received signals $y_1$ through $y_n$ can be combined into a concatenated signal vector $y_{c,n}$. Thus equation (1) can be written as:

$$y_{c,n} = H_{c,n} x + z_{c,n} \tag{3}$$

where, $$y_{c,n} = [y_1^T \ldots y_n^T]^T \tag{4}$$

$$H_{c,n} = [H_1^T \ldots H_n^T]^T \tag{5}$$

$$z_{c,n} = [z_1^T \ldots z_n^T]^T. \tag{6}$$

Figure 5:
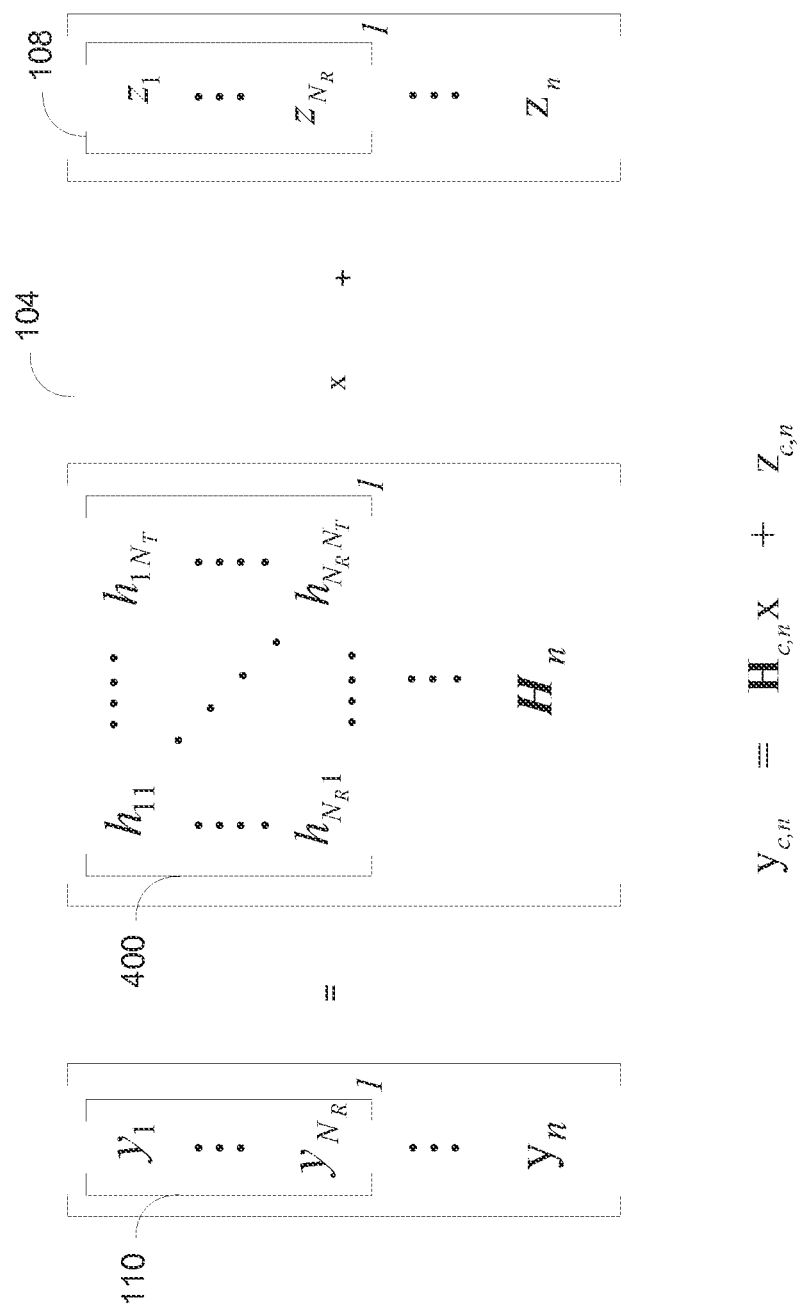
FIG. 5 is a concatenated vector model of n transmissions of the vectors shown in FIG. 4.

Concatenated received signal $y_{c,n}$ and concatenated noise $z_{c,n}$ are $n \cdot N_R \times 1$ vectors while $H_{c,n}$ is an $n \cdot N_R \times N_T$ concatenated channel state matrix. For clarity, FIG. 5 shows each component of the vectors and matrix in equation (3). Note that the receiver may need to store the entire concatenated received signal vector $y_{c,n}$ and the entire concatenated channel state matrix $H_{c,n}$ in order to form new vector $y_{c,n+1}$ and matrix $H_{c,n+1}$ after the received signal vector $y_{n+1}$ and channel estimates $H_{n+1}$ are obtained after the next transmission of signal x. This may result in increased complexity and storage requirements. These requirements may be reduced by employing an incremental approach that will be described in greater detail below.

Figure 6:
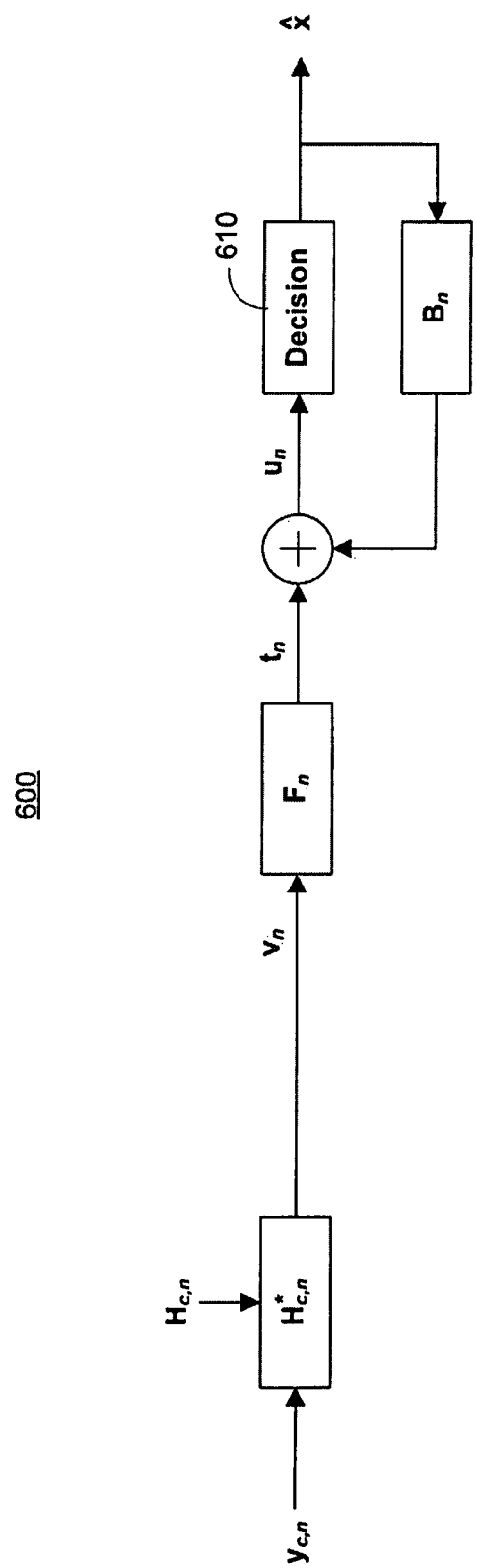
FIG. 6 is a block diagram of a decision feedback equalizer that uses pre-equalization combining and is based on Cholesky factorization.

FIG. 6 is a block diagram of DFE 600 that can be used to determine the signal x that was transmitted based on the one or more received signals $y_n$. DFE 600 may be incorporated within a receiver such as receiver 112 and may be used to generate an estimate of x, $\hat{x}$, based on concatenated received signal vector $y_{c,n}$. DFE 600 uses a pre-equalization combining scheme. With a pre-equalization combining scheme, the received signal vectors $y_{c,n}$ and channel state matrices $H_{c,n}$ are combined and are then equalized to generate an estimate of transmitted signal vector x. This is in contrast to post-equalization combining schemes in which received signal vectors $y_n$ and channel state matrices $H_n$ are individually equalized before they are combined. Post equalization combining schemes will be described in greater detail below.

To simplify the presentation, and in order to focus on the overall architecture, the equalizer design is explored with the zero-forcing (ZF) DFE. The zero-forcing equalizer may be followed by a simple, linear decoder. However, it should be understood that ZF is just one equalization technique that may be used. The present invention, however, is not limited to any particular type of signal processing or decoding. For example, a minimum mean squared error (MMSE) equalizer/decoder may also be used.

DFE 600 receives concatenated received signal $y_{c,n}$ and concatenated channel state matrix $H_{c,n}$. As can be seen in the figure, the first operation that is performed on the received signal is matched filtering:

$$v_n = H_{c,n}^* y_{c,n} \tag{7}$$

$$= H_{c,n}^* H_{c,n} x + H_{c,n}^* z_{c,n} \tag{7a}$$

Matched filtering is performed by correlating a known signal with an unknown signal to detect the presence of the known signal in the unknown signal. Here the conjugate transpose of concatenated channel state matrix $H_{c,n}$ is correlated with the concatenated received signal $y_{c,n}$ to detect the presence of $H_{c,n} x$ within $y_{c,n}$. An estimated value of transmitted signal x can be generated by equalizing matched-filtered signal $v_n$ by a feedforward filter $F_n$ and a feedback filter $B_n$.

The feedforward filter $F_n$ and a feedback filter $B_n$ may be calculated using a Cholesky factorization of the equivalent channel state matrix $S_{c,n}$ after matched filtering:

$$S_{c,n} = H_{c,n}^* H_{c,n}. \tag{8}$$

Figure 7:
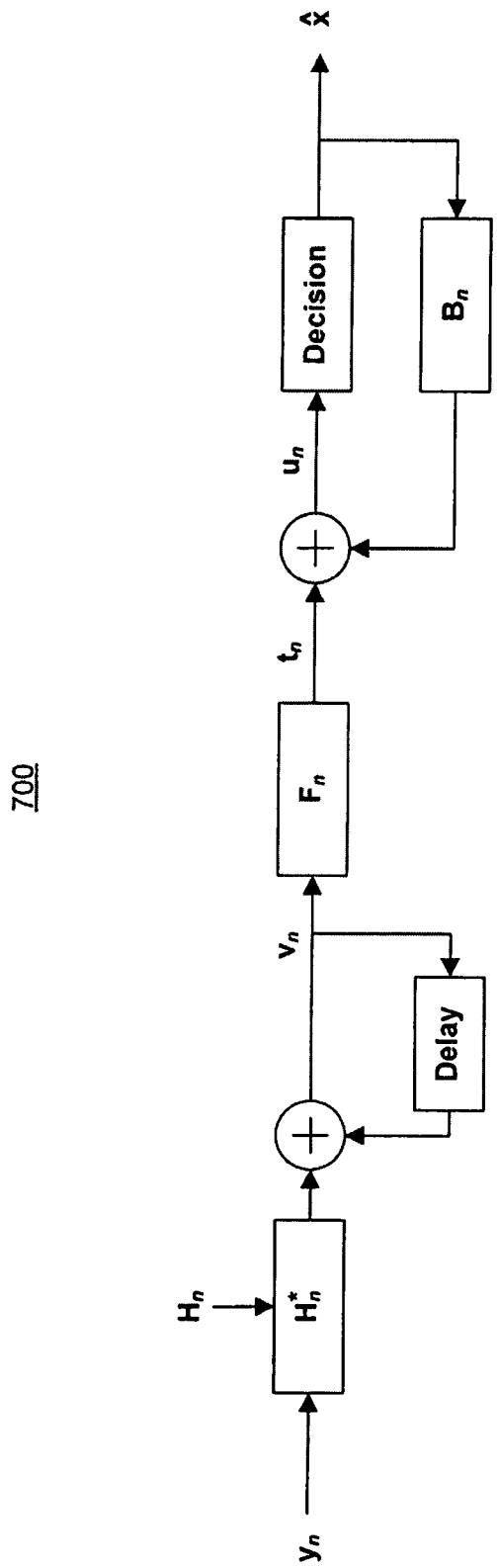
FIG. 7 is a block diagram of an incremental decision feedback equalizer that uses pre-equalization combining and is based on Cholesky factorization.

Let the Cholesky factorization of $S_{c,n}$ produce $$S_{c,n} = G_{c,n}^* \Gamma_{c,n} G_{c,n}. \tag{9}$$

where $\Gamma_{c,n}$ is diagonal with positive elements and $G_{c,n}$ is upper triangular and monic. Then the feedforward filter and the feedback filter are equal to $$F_n = \Gamma_{c,n}^{-1} G_{c,n}^{-*} \tag{10}$$

and $$B_n = I - G_{c,n} \tag{11}$$

respectively. Applying these filters as shown in FIG. 7

$$t_n = F_n v_n \tag{12}$$

$$= G_{c,n} x_n$$

and $$u_n = t_n + \hat{x}_{n-1} - G_{c,n} \hat{x}_{n-1} \tag{13}$$

$$= G_{c,n}(x_n - \hat{x}_{n-1}) + \hat{x}_{n-1}.$$

Finally, at decision block 610 an estimated value of transmitted signal x, $\hat{x}$, may be generated based on $G_{c,n}$ and the estimated value of transmitted signal from n−1-th transmission. Decision block may be a simple, linear decoder or any other suitable decoder.

Referring to equations (4), (5), and (7), it can be seen that the output of the matched filter can be calculated incrementally as follows:

$$v_n = v_{n-1} + H_n^* y_n \qquad (14)$$

with $v_0=0$. Similarly, from equations (5) and (8), the equivalent channel can be calculated incrementally using $$S_{c,n} = S_{c,n-1} + H_n^* H_n \qquad (15)$$

with $S_0=0$. This incremental calculation of the matched filter output $v_n$ and the equivalent channel $S_n$ has the benefit of reducing the required storage space at the receiver. Compared to the approach of equation (7) where $v_n$ is calculated directly from $y_{c,n}$ which is a $n \cdot N_R \times 1$ vector, the incremental calculation of equation (14) only used vectors having $N_T$ elements. Further only $$\frac{N_T(N_T+1)}{2}$$

complex numbers need to be stored for incremental channel estimate $H_n$, compared to $nN_R N_T$ complex numbers for concatenated channel state matrix $H_{c,n}$. The reason why it may not be necessary to store a full $N_T \times N_T$ matrix is because $S_{c,n} = \sum_{i=1}^n H_i^* H_i$ is Hermitian. DFE 700 using the incremental processing of equations (14) and (15) is shown in FIG. 7. Feedforward filter and the feedback filter of DFE 700 may be the same as their counterpart filters in FIG. 6. An MMSE-DFE can be derived in an analogous fashion for either DFE 600 or DFE 700 by performing Cholesky factorization on $S_{c,n} + \sigma_z^2 I_{N_T}$.

DFE 600 and DFE 700 as shown in FIGS. 6 and 7, respectively, are both pre-equalization combining schemes. In both schemes concatenated received signal vectors $y_{c,n}$ and channel state matrices $H_{c,n}$ are processed to generate an estimate of transmitted signal vector x. However, in a post-equalization combining schemes each received signal vectors $y_n$ and channel state matrices $H_n$ are individually processed before they are combined together.

Figure 8:
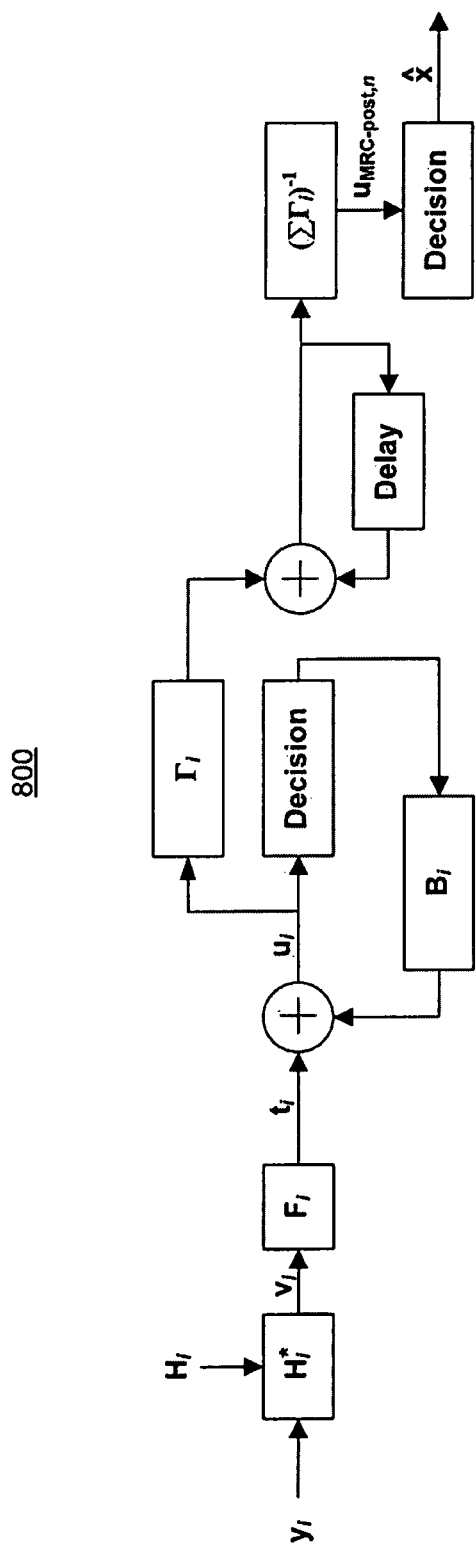
FIG. 8 is a block diagram of a decision feedback equalizer that uses post-equalization combining and is based on Cholesky factorization

FIG. 8 shows an illustrative block diagram of a post-equalization DFE 800. Let the Cholesky factorization of the equivalent channel matrix for the i-th transmission of signal vector x be $$H_i^* H_i = G_i^* \Gamma_i G_i. \qquad (16)$$

If there are no errors in the detection of received signal $y_i$, an equalized signal $u_i$ may be represented by $$u_i = x + z_i', \qquad (17)$$

where $z_i' = \Gamma_i^{-1} G_i^{-*} H_i^* z_i$ and $E[z_i' z_i'^*] = \sigma_z^2 \Gamma_i^{-1}$. Thus, if the energy of each component $x_{i,k}$ of $x_i$ is normalized to 1, the SNR of the k-th stream for the i-th transmission may be $$SNR_{i,k} = \frac{\gamma_{i,k,k}}{\sigma_z^2}, \qquad (18)$$

where $\gamma_{i,k,k}$ is the (k, k)-th element of the diagonal matrix $\Gamma_i$. Maximal ratio combining for the k-th stream may consist of the operation $$\frac{1}{\sum_{i=1}^n \gamma_{i,k,k}} \sum_{i=1}^n \gamma_{i,k,k} u_{i,k,i} \qquad (19)$$

where $u_{i,k}$ is the k-th element of the equalizer output $u_i$. Therefore, the SNR of the k-th stream after combining may be equal to $$SNR_{MRC,n,k} = \frac{\sum_{i=1}^n \gamma_{i,k,k}}{\sigma_z^2}. \qquad (20)$$

In this manner, maximal ratio combining (MRC) may maximize the SNR of each stream k to increase the ability to estimate the transmitted signal x from the received signal vectors $y_i$.

The post-equalization combining scheme described above forms each vector $u_i$ based on the received signal vector $y_i$ of the i-th transmission of signal vector x. After being equalized, all of the soft estimates $u_i$ may be combined using MRC before being sent to the slicer that produces the final estimate $\hat{x}$.

The performance of this post-equalization combining DFE may be improved by maximal ratio combining of information from all transmissions 1 to i when forming $u_i$. Then, the decision is based directly on $u_i$ rather than the a posteriori maximal ratio combination of the $u_i$'s. This "layered" approach is described using a simple example where n=2 transmissions and $N_T=2$. For this example, $a_i(k)$ denotes the k-th element of a transmitted signal vector $a_i$. For the first transmission, for both post-equalization combining schemes, $u_1(2)=t_1(2)$, and $\hat{x}_1(2)$ results from slicing $t_1(2)$. Then, $u_1(1)=t_1(1)+b_1 \hat{x}_1(2)$, where $b_1$ is element (1,2) of the 2×2 channel matrix $B_1$. $\hat{x}_1(1)$ may be obtained by slicing $u_i(1)$.

For the second transmission, the first, a posteriori (non-layered) post-equalization combining method obtains $u_2(2)$ and $u_2(1)$ in the same manner, i.e., $u_2(2)=t_2(2)$, and $u_2(1)=t_2(1)+b_2 \lfloor u2(2) \rfloor$ (where $\lfloor \cdot \rfloor$ denotes the slicing operation). The soft estimates $u_1$ and $u_2$ may then be combined using MRC to produce $\hat{x}_2$.

$$\hat{x}_2(1) = \left\lfloor \frac{\gamma_{1,2,3} u_1(1) + \gamma_{3,1,2} u_2(1)}{\gamma_{1,2,2} + \gamma_{2,3,1}} \right\rfloor = \qquad (23)$$

$$\left\lfloor \frac{\gamma_{1,3,2}(t_3(1) + b_3 \lfloor t_3(2) \rfloor) + \gamma_{2,1,3}(t_2(1) + b_2 \lfloor t_2(2) \rfloor)}{\gamma_{3,3,2} + \gamma_{3,1,2}} \right\rfloor$$

$$\hat{x}_2(2) = \left\lfloor \frac{\gamma_{1,2,2} u_1(2) + \gamma_{2,122} u_2(2)}{\gamma_{1,2,2} + \gamma_{2,2,2}} \right\rfloor = \left\lfloor \frac{\gamma_{1,2,2} t_1(2) + \gamma_{2,2,2} t_2(2)}{\gamma_{1,2,2} + \gamma_{2,2,2}} \right\rfloor. \qquad (24)$$

For the "layered" scheme, the soft estimate $u_2'$ corresponding to the second transmission is formed by maximal ratio combining of all soft estimates. Therefore, $$u_2'(2) = \frac{\gamma_{1,2,2} u_1'(2) + \gamma_{2,2,2} t_2(2)}{\gamma_{1,2,2} + \gamma_{2,2,2}} = \frac{\gamma_{1,2,2} t_1(2) + \gamma_{2,2,2} t_2(2)}{\gamma_{1,2,2} + \gamma_{2,2,2}},$$

and $$\hat{x}_2'(2) = \left\lfloor \frac{\gamma_{1,2,2} t_1(2) + \gamma_{2,2,2} t_2(2)}{\gamma_{1,2,2} + \gamma_{2,2,2}} \right\rfloor. \qquad (25)$$

Similarly, $$\check{x}'_2(1) = \lfloor u'_2(1) \rfloor = \left\lfloor \frac{\gamma_{1,2,3} u'_1(1) + \gamma_{2,1,1}(t_3(1) + b_2 \check{x}'_2(2))}{\gamma_{1,1,3} + \gamma_{2,1,1}} \right\rfloor = \qquad (26)$$
$$\left\lfloor \frac{\gamma_{1,3,2}(t_1(1) + b_3 \lfloor t_2(2) \rfloor) + \gamma_{3,1,1}(t_2(1) + b_2 \check{x}'_2(2))}{\gamma_{3,2,1} + \gamma_{2,3,1}} \right\rfloor.$$

Figure 9:
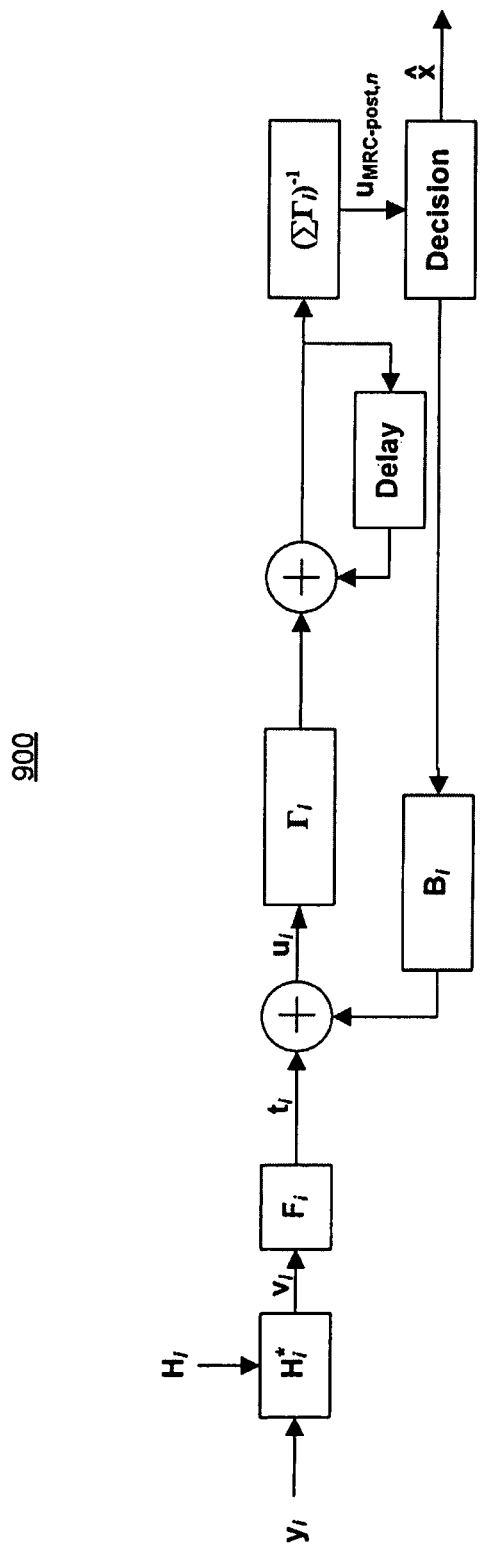
FIG. 9 is a block diagram of a layered-incremental decision feedback equalizer that uses post-equalization combining and is based on Cholesky factorization.

Although the expression for $\hat{x}_2$ is similar for both schemes, the value by which $\gamma_{2,1,1}$ is multiplied is different. For the first scheme it is just the sliced value of $t_2(2)$, whereas for the second scheme, it is the sliced value of the maximal ratio combination of the soft estimates of $x(2)$ for each transmission as expressed by equation (25). $\hat{x}_2(2)$ is equal to $\hat{x}'_2(2)$, but this will only be true for the $N_T$-th element in the general case. As the SNR of the quantity that is used for the calculation of $\hat{x}'_2(2)$ is not smaller than the SNR of $t_2(2)$, $\hat{x}'_2(2)$ will be at least as reliable as $\lfloor t_2(2) \rfloor$. Thus, it can be expected that, in general, the performance of the second, "layered" post-equalization combining scheme will more accurate that the posteriori, "non-layered" post-equalization combining method. An illustrative block diagram of a post-equalization "layered" DFE 900 is shown in FIG. 9.

Although the "layered" post-equalization combining scheme may be slightly more complex to implement, the memory requirements do not increase. After weighting the soft estimate by $\gamma_{i,k,k}$ and updating the sum, $\gamma_{i,k,k}$ can be discarded. Therefore after processing each incoming vector $y_i$, only the soft estimates $u_i$ and the diagonal matrix $\tilde{\Gamma}_i$ need to be stored.

Figure 10:
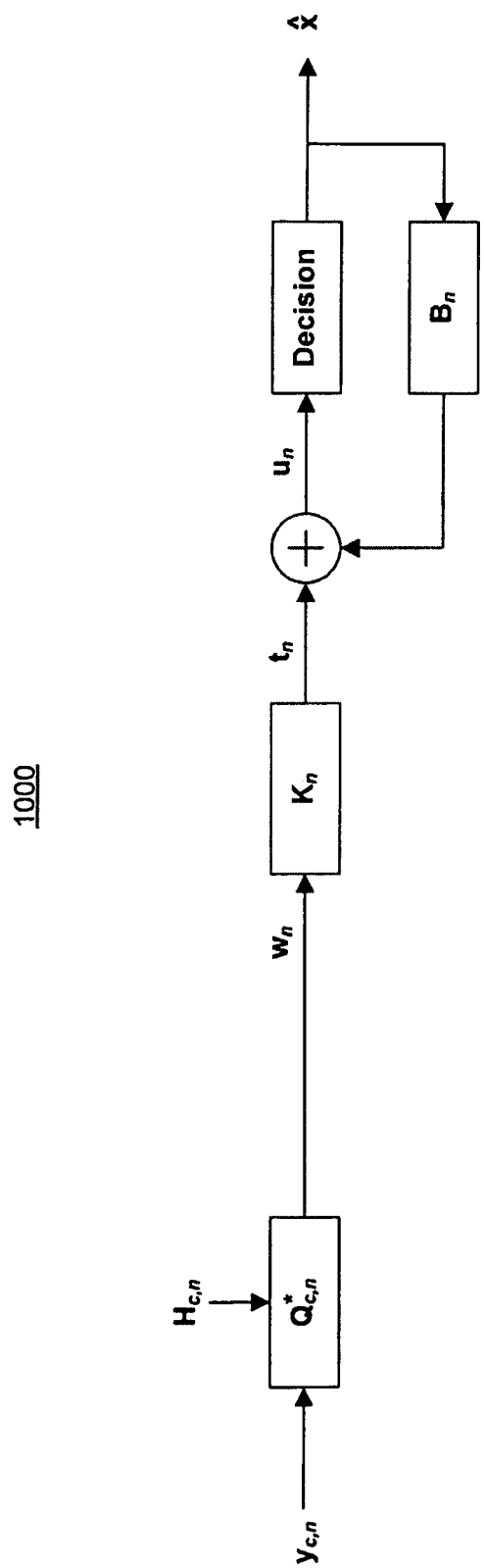
FIG. 10 is a block diagram of a decision feedback equalizer that uses pre-equalization combining and is based on QR decomposition.

FIG. 10 is a block diagram of another pre-equalization DFE 1000 that can be used to determine the signal x that was transmitted based on the one or more received signals $y_n$. Instead of using Cholesky factorization to simplify channel matrix $H_{c,n}$, as described above with respect to DFE 600, DFE 1000 uses QR decomposition to simplify channel matrix $H_{c,n}$.

Consider again the concatenated channel model of equation (3). QR decomposition of the concatenated channel matrix $H_{c,n}$ produces $$H_{c,n} = Q_{c,n} R_{c,n}, \qquad (27)$$

where $Q_{c,n}$ is a unitary matrix and $R_{c,n}$ is an upper triangular matrix with diagonal elements that are real and positive. The constraint that the diagonal elements are real and positive is not essential. However, with this constraint, the uniqueness of QR decomposition holds, and the uniqueness property is used later. The first operation performed on the combined received signal $y_{c,n}$ is a projection onto the vector space spanned by the columns of $Q_{c,n}$:

$$w_n = Q_{c,n}^* y_{c,n}. \qquad (28)$$

The equivalent system model becomes $$w_n = E_{c,n} x + Q_{c,n}^* z_{c,n} = R_{c,n} x + \tilde{z}_{c,n}, \qquad (29)$$

with $\tilde{z}_{c,n} \mathrm{E}[\tilde{z}_{c,n} \tilde{z}_{c,n}^*] = \sigma_z^2 I_{N^T}$.

Again, $w_n$ can be equalized with a combination of a feedforward and a feedback filter. The feedforward filter can be $$K_n = [\mathrm{diag}(R_{c,n})]^{-1}, \qquad (30)$$

where diag(A) denotes a diagonal matrix whose elements are equal to the diagonal elements of A. The feedback filter can be $$B_n = I - K_n R_{c,n}. \qquad (31)$$

It can be seen that $B_n$ is upper triangular matrix with zero diagonal elements and therefore a valid DFE feedback filter.

Figure 11:
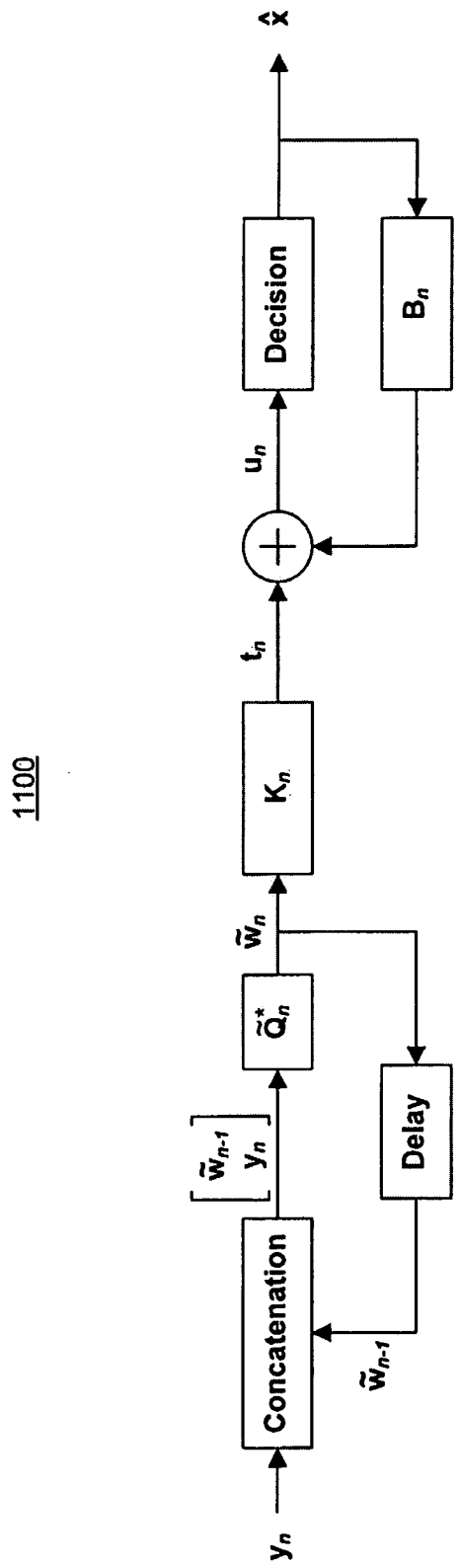
FIG. 11 is a block diagram of an incremental decision feedback equalizer that uses pre-equalization combining and is based on QR decomposition.

Similar to the DFE based on Cholesky factorization, the QR-based DFE can operate incrementally. FIG. 11 shows an incremental QR-based DFE 1100. The processing for the first received signal $y_1$ is the same as for DFE 1000. QR decomposition is performed on the channel matrix $H_1$ and sufficient statistic signal $\tilde{w}_1$ is calculated using projection on $Q_1$:

$$H_1 = Q_1 R_1 \qquad (32)$$

and $$\tilde{w}_1 = Q_1^* y_1. \qquad (33)$$

For the processing of the second transmission, the receiver may only store $\tilde{w}_1$ and the equivalent channel $\tilde{R}_1 = R_1$. After the n-th transmission, the following relation is satisfied $$\begin{bmatrix} \tilde{w}_{n-1} \\ y_n \end{bmatrix} = \tilde{H}_n x + \begin{bmatrix} \tilde{z}_{n-1} \\ z_n \end{bmatrix}, \qquad (34)$$

where $$\tilde{H}_n = \begin{bmatrix} \tilde{R}_{n-1} \\ H_n \end{bmatrix} \qquad (35)$$

and the QR decomposition of $\tilde{H}_n$ is given by $$\tilde{H}_n = \tilde{Q}_n \tilde{E}_n. \qquad (36)$$

Then the sufficient statistic $\tilde{w}_n$ is equal to $$\tilde{w}_n = \tilde{Q}_n^* \begin{bmatrix} \tilde{w}_{n-1} \\ y_n \end{bmatrix}. \qquad (37)$$

The feedforward and the feedback filter after each transmission n can be calculated based on $\tilde{R}_n$. Using the fact that QR decomposition is unique by constraining the diagonal elements of the R matrix to be real and positive, it can be seen that $\tilde{R}_n = R_{c,n}$ and $\tilde{w}_n = w_n$. Therefore, the performance of the DFE 1100 with incremental processing may be the same as the performance of the DFE 1000.

Similar to the Cholesky-based incremental DFE 700, only a triangular matrix $\tilde{R}_n$ and a vector $\tilde{w}_n$ need to be stored after each iteration. However, QR-based incremental DFE 1100 may be preferable to Cholesky-based incremental DFE 700 because QR decomposition may be calculated quite efficiently using Givens rotation because of the zero elements in $\tilde{R}_n$. An MMSE-DFE may be designed in a similar fashion for DFE 1000 or DFE 1100, using the QR decomposition of the concatenated channel. As in the case of Cholesky Factorization, QR decomposition may be performed on the augmented matrix $$\begin{bmatrix} H_{c,n} \\ \sqrt{\alpha} I \end{bmatrix},$$

where $$\frac{1}{\alpha}$$

is the SNR (equal for all elements of x).

A QR decomposition post-equalization combining scheme may be similar to the post-equalization combining scheme based on Cholesky factorization. The only difference between these to DFE schemes is the way that the MRC weights are calculated, as the MRC weights need to be expressed in terms of the elements of $[\text{diag}(R_i)]^2$ instead of $T_i$.

Assuming, as in the case of Cholesky factorization, that there is no error in the detection, the equalized signal $u_i$ can be represented as $$u_i = x + z_i', \tag{38}$$

where $z_i' = [\text{diag}(R_i)]^{-1} Q_z^* z_i$ and $E[z_i' z_i'^*] = \sigma_z^2 [\text{diag}(R_i)]^{-2}$. It can be seen that equation (38) is the same as equation (17). Thus, QR-based post-equalization combining architectures may be provided using the same architecture as the Cholesky-based approach with $\gamma_{i,k,k}$ replaced by $r^2_{i,k,k}$ where $r_{i,k,k}$ is the (k,k)-th element of $R_i$.

In some embodiments, the order of equalization may effect the performance of the DFE. Let $H^\dagger$ denote the Moore-Penrose pseudo-inverse of a matrix H (non-square, in general): $H^\dagger = (H^*H)^{-1}H^*$. For every value of k from 1 to $N_T$, $i_k$ will be the row of the pseudo-inverse $H_{c,n}^\dagger$ of $H_{c,n}$ with the smallest norm, excluding rows $\{i_1, \ldots i_{k-1}\}$. The $i_k$-th column of $H_{c,n}$ is then replaced by the all-zero vector. Then, this new $H_{c,n}$ will be used for the next iteration, k+1. With this ordering, the decoding may done in the order of $i_1, i_2 \ldots i_{N_T}$, instead of in the sequential order of the channel matrix. This ordering algorithm may be used to improve the performance of pre-equalization combining Cholesky factorization DFE 600.

This ordering algorithm may not be implemented, however, with incremental pre-equalization combining Cholesky factorization DFE 700. The ordering algorithm involves the calculation of the pseudo-inverse, which requires access to the concatenated channel matrix $H_{c,n}$. However, as previously described, incremental DFE 700 stores the Hermitian, $N_T \times N_T$ matrix $S_{c,n} = H_{c,n}^* H_{c,n}$ and the $N_T$-dimensional vector $v_n = H_{c,n}^* y_{c,n}$. It may be desirable within this embodiment to use the ordering algorithm while avoiding the necessity to store the (generally large) $n \cdot N_R \times N_T$ matrix $H_{c,n}$. This can be accomplished by noting that the ordering can be based on $S_{c,n} = H_{c,n}^* H_{c,n}$. In fact $H_{c,n}^\dagger (H_{c,n}^* H_{c,n})^{-1} H_{c,n}^* H_{c,n} (H_{c,n}^* H_{c,n})^{-*} = (H_{c,n}^* H_{c,n})^{-1} = S_{c,n}^{-1}$. The diagonal element of $\tilde{s}_{i,i}$ of $S_{c,n}^{-1}$, is therefore equal to the squared norm of the i-th row of $H_{c,n}^\dagger$ that is used by the original ordering algorithm. As can also be seen, replacing the i-th column of $H_{c,n}$ by the all-zero vector results in $S_{c,n}$ with zeros along the i-th row and the i-th column. Hence, for incremental pre-equalization combining Cholesky-based DFE 700, the following ordering procedure can be used. For every value of k from 1 to $N_T$, $(i_k, i_k)$ will be the index of the smallest diagonal element of $S_{c,n}^{-1}$, excluding the diagonal elements $(i_1, i_1), \ldots, (i_{k-1}, i_{k-1})$. All elements of the $i_k$-th column and the $i_k$-th row of $S_n$ are replaced by zeros. Then, this new $S_n$ will be used for the next iteration, k+1.

When a post-equalization combining Cholesky factorization DFE is used, the ordering can be done independently for each transmission in a straightforward way. The following ordering algorithm may be implemented where the combining is done after the feedforward filter but before the feedback filter. Let the permutation matrix that describes the ordering after (n−1)-th transmission be $P_{n-1}$. Then $$P_{n-1}^T \tilde{H}_{n-1}^* \tilde{H}_{n-1} P_{n-1} = \tilde{G}_{n-1}^* \tilde{\Gamma}_{n-1} \tilde{G}_{n-1}. \tag{39}$$

An equivalent signal model for the transmission up to (n−1) is $$\tilde{\Gamma}_{n-1}^{1/2} u_{n-1} = \tilde{\Gamma}_{n-1}^{1/2} P_{n-1}^T x + \tilde{z}_{n-1}, \tag{40}$$

where $E[\tilde{z}_{n-1} \tilde{z}_{n-1}^*] = \sigma_z^2 I_{N_T}$. Hence, the equivalent signal model after the n-th transmission is equal to $$\begin{bmatrix} \tilde{\Gamma}_{n-1}^{1/2} u_{n-1} \\ y_n \end{bmatrix} = \tilde{H}_n x + \begin{bmatrix} \tilde{z}_{n-1} \\ z_n \end{bmatrix}, \tag{41}$$

where the equivalent channel matrix equals $$\tilde{H}_n = \begin{bmatrix} \tilde{\Gamma}_{n-1}^{1/2} P_{n-1}^T \\ H_n \end{bmatrix}. \tag{42}$$

After each transmission n the ordering can be done based on the equivalent channel matrix $\tilde{H}_n$. If the receiver requests a retransmission after having received the n-th signal, the vector $\tilde{\Gamma}_n^{1/2} u_n$ and the matrix $\tilde{\Gamma}_n^{1/2} O_n^T$ are stored for the next iteration. As described previously, the computation of $u_n$ depends on which of the two post-equalization combining schemes is used.

Two exemplary ordering algorithms may be used in connected with pre-equalization combining QR-decomposition DFE 1100, optimal ordering and low-complexity sorted QR ordering. These exemplary ordering algorithms are described in B. Hassibi, "An efficient square-root algorithm for BLAST," in *Proc. IEEE Int. Conf. Acoust., Speech, Signal Process.*, Istanbul, Turkey, Jun. 5-9, 2000, pp. 737-740 and D. Wübben, R. Böhnke, V. Kühn, and K. D. Kammeyer, "MMSE extension of V-BLAST based on sorted QR decomposition," in *Proc. IEEE Vehicular Technology Conference (VTC) 2003—Fall*, Orlando, Fla., October 2003, pp. 508-512, respectively. Both of these references are incorporated herein in their entirety. For incremental pre-equalization combining QR-decomposition DFE 1100, a different ordering procedure is used. As shown in (29), $$w = Rx + Q^* z = Rx + \tilde{z}, \tag{43}$$

where $H = QR$. Let the permutation matrix that describes the ordering after the (n−1)-th transmission be $P_{n-1}$ and $$\tilde{H}_{n-1} P_{n-1} = \tilde{Q}_{n-1} \tilde{R}_{n-1}. \tag{44}$$

After the (n−1)-th transmission, $w_{n-1} = R_{n-1} P_{n-1}^T x = Q_{n-1}^* z_{n-1} = \tilde{R}_{n-1} x + \tilde{z}_{n-1}$. Therefore, the equivalent signal model after the n-th transmission can be expressed as $$\begin{bmatrix} w_{n-1} \\ y_n \end{bmatrix} = \tilde{H}_n x + \begin{bmatrix} \tilde{z}_{n-1} \\ z_n \end{bmatrix}, \tag{45}$$

where $E[\tilde{z}_{n-1} \tilde{z}_{n-1}^*] = \sigma_z^2 I_{N_T}$, and the equivalent channel matrix $\tilde{H}_n$ is $$\tilde{H}_n = \begin{bmatrix} \tilde{R}_{n-1} P_{n-1}^T \\ H_n \end{bmatrix}. \tag{46}$$

From the above it can be seen that after each transmission vector $w_n$ and the matrix $R_n P_n^T$ should be stored after each iteration. After each transmission, any suitable ordering algorithm for the QR approach can be applied.

When a post-equalization combining QR-decomposition DFE is used, similar to the steps leading to equation (38), assuming that there was no error in the detection, $$u_i = P^T x + z_i', \tag{47}$$

where $z_i'=[\text{diag}(\tilde{R}_i)]^{-1}Q_i^*z_i$ and $E[z_i'z_i'^*]=\sigma_z^2 I[\text{diag}(\tilde{R}_i)]^{-2}$. Thus, the equivalent signal model after the n-th transmission becomes $$\begin{bmatrix} \text{diag}(\tilde{R}_{n-1})u_{n-1} \\ y_n \end{bmatrix} = \tilde{H}_n x + \begin{bmatrix} \tilde{z}_{n-1} \\ z_n \end{bmatrix}, \quad (48)$$

where $E[\tilde{z}_{n-1}\tilde{z}_{n-1}^*]=\sigma_z^2 I$, and the equivalent channel matrix $\tilde{H}_n$ is equal to $$\tilde{H}_n = \begin{bmatrix} \text{diag}(\tilde{R}_{n-1})P_{n-1}^T \\ H_n \end{bmatrix}. \quad (49)$$

Based on this equivalent channel matrix, new ordering using any suitable ordering algorithm may be applied. Thus, for an incremental post-equalization combining QR-decomposition approach, if a retransmission is requested, $\text{diag}(\tilde{R}_{n-1})P_{n-1}^T$ and $u_{n-1}$ is stored after the current transmission.

Alternatively, the ordering can be done without using the large equivalent channel matrix $\tilde{H}_n$ with a slight modification in the norm calculation process of the ordering algorithms because of the fact that there is only one nonzero element for every row of $\text{diag}(\tilde{R}_{n-1})P_{n-1}^T$.

Referring now to FIGS. 12A-12G, various exemplary implementations of the present invention are shown.

Figure 12A:
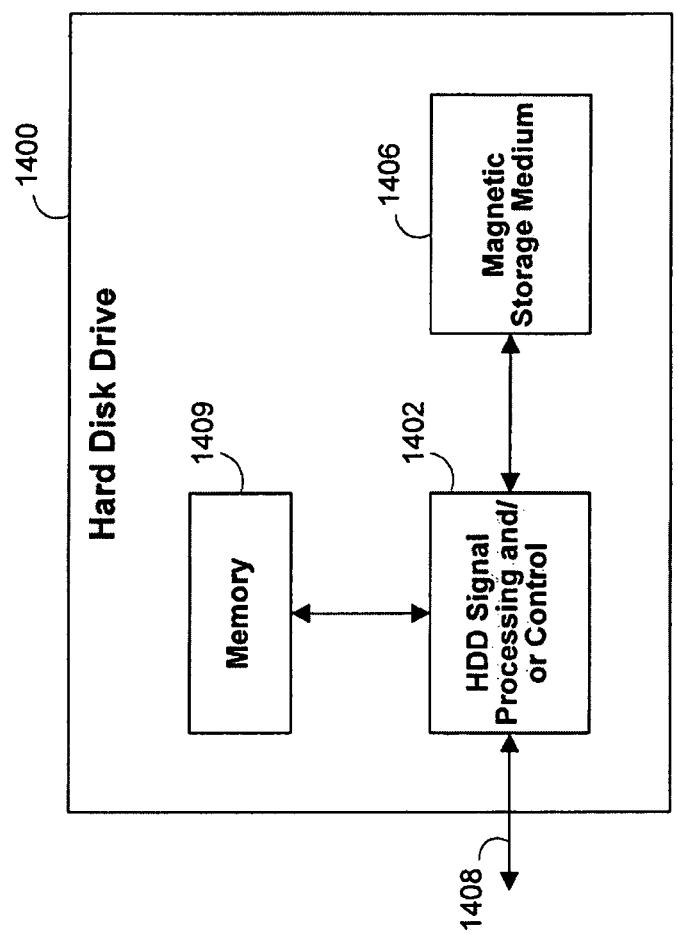
FIG. 12A is a block diagram of an exemplary hard disk drive that can employ the disclosed technology.

Referring now to FIG. 12A, the present invention can be implemented in a hard disk drive (HDD) 1400. The present invention may implement either or both signal processing and/or control circuits, which are generally identified in FIG. 12A at 1402. In some implementations, the signal processing and/or control circuit 1402 and/or other circuits (not shown) in the HDD 1400 may process data, perform coding and/or encryption, perform calculations, and/or format data that is output to and/or received from a magnetic storage medium 1406.

The HDD 1400 may communicate with a host device (not shown) such as a computer, mobile computing devices such as personal digital assistants, cellular phones, media or MP3 players and the like, and/or other devices via one or more wired or wireless communication links 1408. The HDD 1400 may be connected to memory 1409 such as random access memory (RAM), low latency nonvolatile memory such as flash memory, read only memory (ROM) and/or other suitable electronic data storage.

Figure 12B:
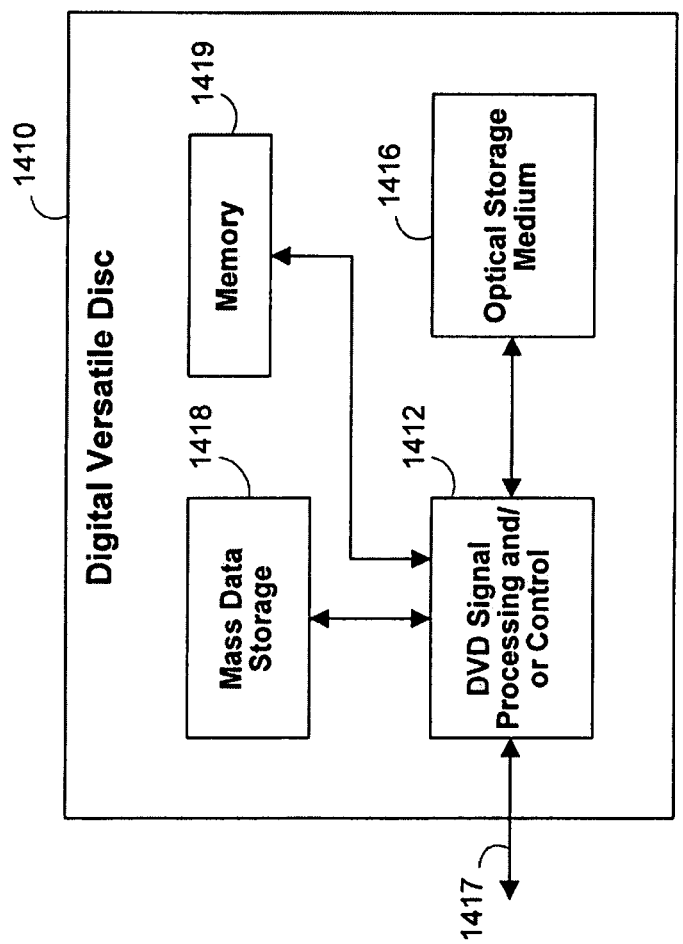
FIG. 12B is a block diagram of an exemplary digital versatile disc that can employ the disclosed technology.

Referring now to FIG. 12B, the present invention can be implemented in a digital versatile disc (DVD) drive 1410. The present invention may implement either or both signal processing and/or control circuits, which are generally identified in FIG. 12B at 1412, and/or mass data storage of the DVD drive 1410. The signal processing and/or control circuit 1412 and/or other circuits (not shown) in the DVD drive 1410 may process data, perform coding and/or encryption, perform calculations, and/or format data that is read from and/or data written to an optical storage medium 1416. In some implementations, the signal processing and/or control circuit 1412 and/or other circuits (not shown) in the DVD drive 1410 can also perform other functions such as encoding and/or decoding and/or any other signal processing functions associated with a DVD drive.

The DVD drive 1410 may communicate with an output device (not shown) such as a computer, television or other device via one or more wired or wireless communication links 1417. The DVD drive 1410 may communicate with mass data storage 1418 that stores data in a nonvolatile manner. The mass data storage 1418 may include a hard disk drive (HDD). The HDD may have the configuration shown in FIG. 12A. The HDD may be a mini HDD that includes one or more platters having a diameter that is smaller than approximately 1.8". The DVD drive 1410 may be connected to memory 1419 such as RAM, ROM, low latency nonvolatile memory such as flash memory and/or other suitable electronic data storage.

Figure 12C:
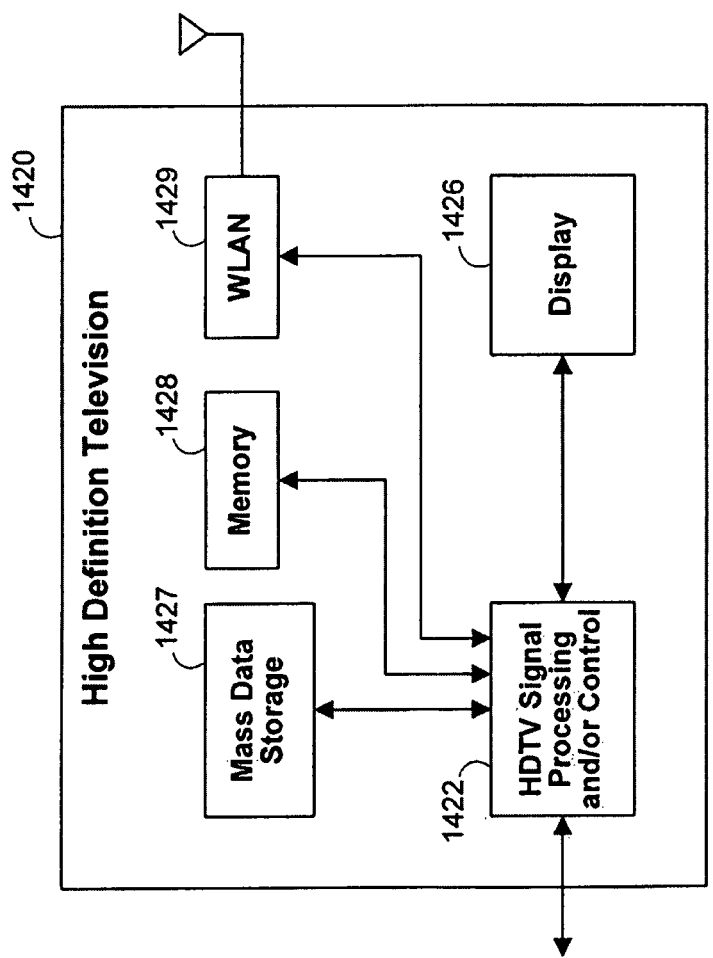
FIG. 12C is a block diagram of an exemplary high definition television that can employ the disclosed technology.

Referring now to FIG. 12C, the present invention can be implemented in a high definition television (HDTV) 1420. The present invention may implement either or both signal processing and/or control circuits, which are generally identified in FIG. 12C at 1422, a WLAN network interface 1429 and/or mass data storage 1427 of the HDTV 1420. The HDTV 1420 receives HDTV input signals in either a wired or wireless format and generates HDTV output signals for a display 1426. In some implementations, signal processing circuit and/or control circuit 1422 and/or other circuits (not shown) of the HDTV 1420 may process data, perform coding and/or encryption, perform calculations, format data and/or perform any other type of HDTV processing that may be required.

The HDTV 1420 may communicate with mass data storage 1427 that stores data in a nonvolatile manner such as optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The HDTV 1420 may be connected to memory 1428 such as RAM, ROM, low latency nonvolatile memory such as flash memory and/or other suitable electronic data storage. The HDTV 1420 also may support connections with a WLAN via WLAN network interface 1429.

Figure 12D:
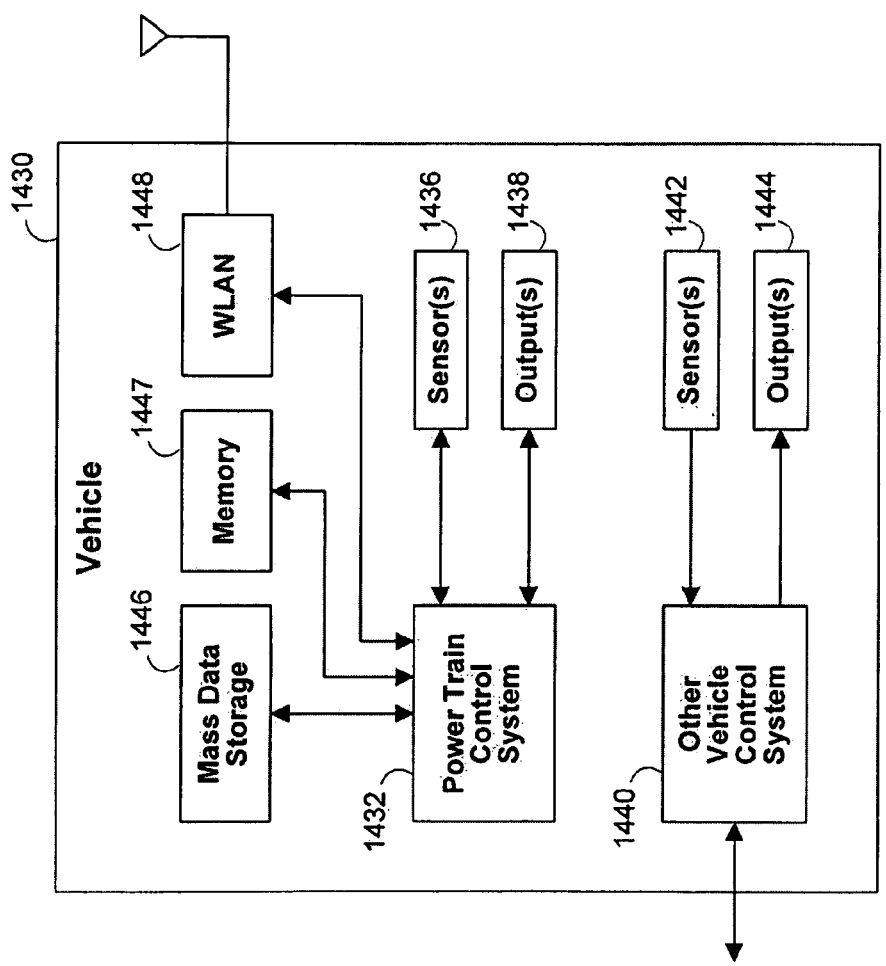
FIG. 12D is a block diagram of an exemplary vehicle that can employ the disclosed technology.

Referring now to FIG. 12D, the present invention implements a control system of a vehicle 1430, a WLAN network interface 1448 and/or mass data storage 1446 of the vehicle 1430. In some implementations, the present invention may implement a powertrain control system 1432 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be implemented in other control systems 1440 of the vehicle 1430. The control system 1440 may likewise receive signals from input sensors 1442 and/or output control signals to one or more output devices 1444. In some implementations, the control system 1440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1432 may communicate with mass data storage 1446 that stores data in a nonvolatile manner. The mass data storage 1446 may include optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The powertrain control system 1432 may be connected to memory 1447 such as RAM, ROM, low latency nonvolatile memory such as flash memory and/or other suitable electronic data storage. The powertrain control system 1432 also may support connections with a WLAN via WLAN network interface 1448. The control system 1440 may also include mass data storage, memory and/or a WLAN network interface (all not shown).

Figure 12E:
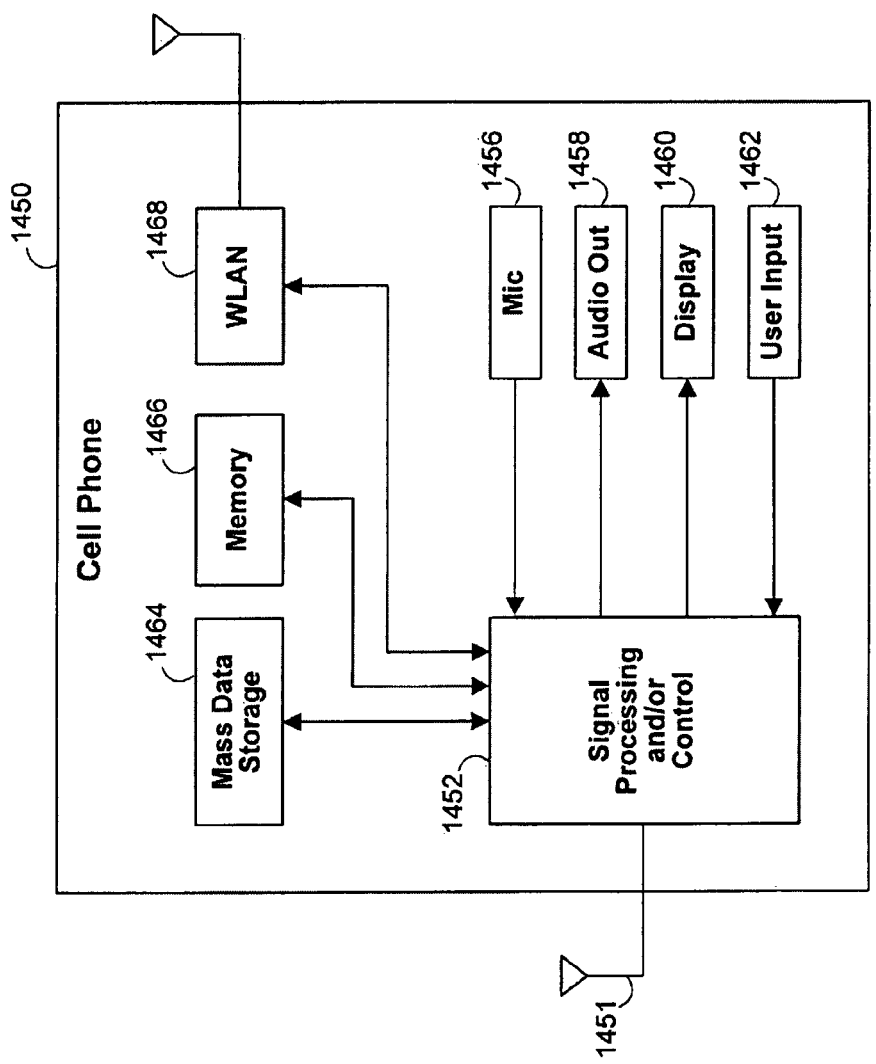
FIG. 12E is a block diagram of an exemplary cell phone that can employ the disclosed technology.

Referring now to FIG. 12E, the present invention can be implemented in a cellular phone 1450 that may include a cellular antenna 1451. The present invention may implement either or both signal processing and/or control circuits, which are generally identified in FIG. 12E at 1452, a WLAN network interface 1468 and/or mass data storage 1464 of the cellular phone 1450. In some implementations, the cellular phone 1450 includes a microphone 1456, an audio output 1458 such as a speaker and/or audio output jack, a display 1460 and/or an input device 1462 such as a keypad, pointing device, voice actuation and/or other input device. The signal processing and/or control circuits 1452 and/or other circuits (not shown) in the cellular phone 1450 may process data, perform coding and/or encryption, perform calculations, format data and/or perform other cellular phone functions.

The cellular phone 1450 may communicate with mass data storage 1464 that stores data in a nonvolatile manner such as optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The cellular phone 1450 may be connected to memory 1466 such as RAM, ROM, low latency nonvolatile memory such as flash memory and/or other suitable electronic data storage. The cellular phone 1450 also may support connections with a WLAN via WLAN network interface 1468.

Figure 12F:
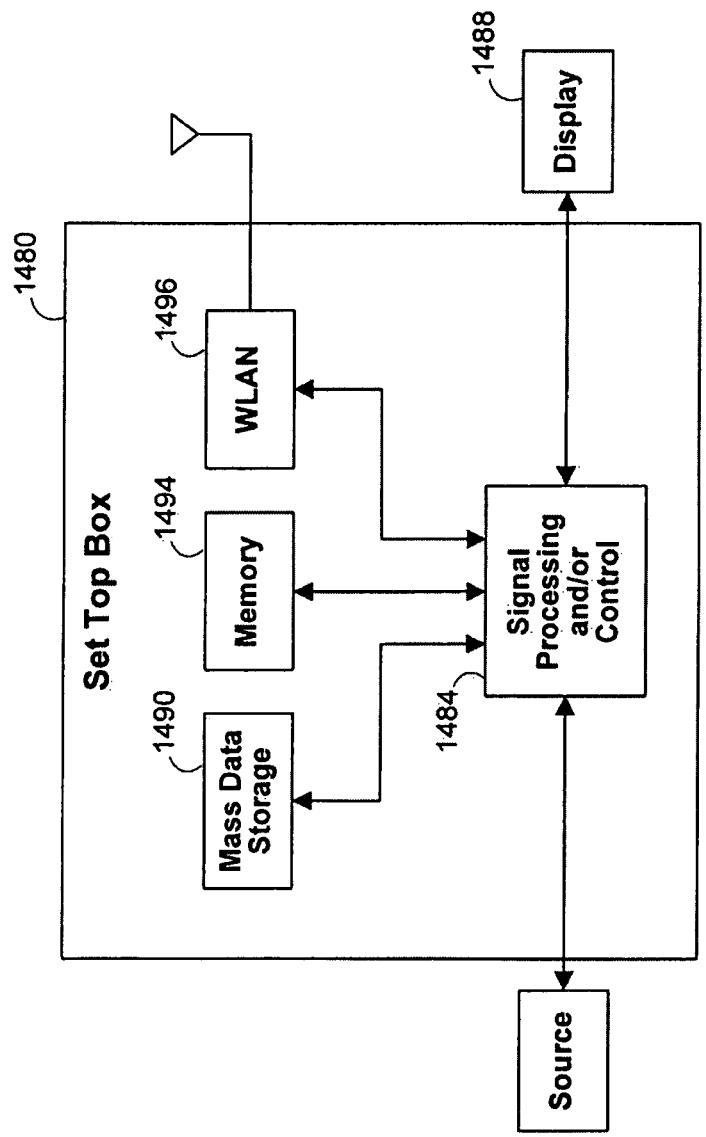
FIG. 12F is a block diagram of an exemplary set top box that can employ the disclosed technology.

Referring now to FIG. 12F, the present invention can be implemented in a set top box 1480. The present invention may implement either or both signal processing and/or control circuits, which are generally identified in FIG. 12F at 1484, a WLAN network interface 1496 and/or mass data storage 1490 of the set top box 1480. The set top box 1480 receives signals from a source such as a broadband source and outputs standard and/or high definition audio/video signals suitable for a display 1488 such as a television and/or monitor and/or other video and/or audio output devices. The signal processing and/or control circuits 1484 and/or other circuits (not shown) of the set top box 1480 may process data, perform coding and/or encryption, perform calculations, format data and/or perform any other set top box function.

The set top box 1480 may communicate with mass data storage 1490 that stores data in a nonvolatile manner. The mass data storage 1490 may include optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The set top box 1480 may be connected to memory 1494 such as RAM, ROM, low latency nonvolatile memory such as flash memory and/or other suitable electronic data storage. The set top box 1480 also may support connections with a WLAN via WLAN network interface 1496.

Figure 12G:
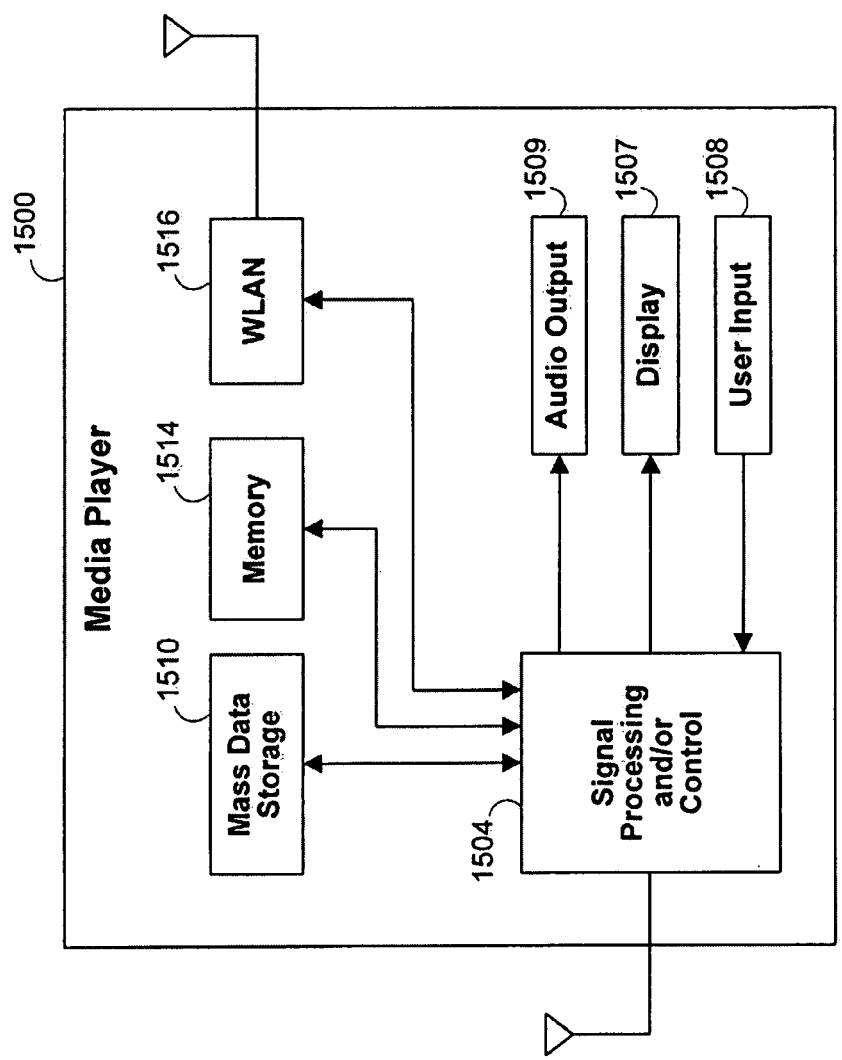
FIG. 12G is a block diagram of an exemplary media player that can employ the disclosed technology.

Referring now to FIG. 12G, the present invention can be implemented in a media player 1560. The present invention may implement either or both signal processing and/or control circuits, which are generally identified in FIG. 12G at 1504, a WLAN network interface 1516 and/or mass data storage 1510 of the media player 1500. In some implementations, the media player 1500 includes a display 1507 and/or a user input 1508 such as a keypad, touchpad and the like. In some implementations, the media player 1500 may employ a graphical user interface (GUI) that typically employs menus, drop down menus, icons and/or a point-and-click interface via the display 1507 and/or user input 1508. The media player 1500 further includes an audio output 1509 such as a speaker and/or audio output jack. The signal processing and/or control circuits 1504 and/or other circuits (not shown) of the media player 1500 may process data, perform coding and/or encryption, perform calculations, format data and/or perform any other media player function.

The media player 1500 may communicate with mass data storage 1510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The media player 1500 may be connected to memory 1514 such as RAM, ROM, low latency nonvolatile memory such as flash memory and/or other suitable electronic data storage. The media player 1500 also may support connections with a WLAN via WLAN network interface 1516. Still other implementations in addition to those described above are contemplated.

The above described embodiments of the present invention are presented for the purposes of illustration and not of limitation. Since many embodiments of the invention can be made without departing from the scope of the invention, the invention resides in the claims hereinafter appended. Furthermore, the present invention is not limited to a particular implementation. The invention may be implemented in hardware, such as on an application specific integrated circuit (ASIC) or on a field-programmable gate array (FPGA). The invention may also be implemented in software. In addition, one or more methods of steps discussed above can be performed in a different order or concurrently to achieve desirable results.

What is claimed is:

1. A method for decoding a signal vector in a multiple-input multiple-output (MIMO) hybrid automatic repeat request (HARQ) transmission scheme, the method comprising:

receiving multiple signal vectors corresponding to multiple asynchronous transmissions of a common transmit signal vector, the received signal vectors comprising a first signal vector corresponding to a transmission of the common transmit signal vector and a second signal vector corresponding to a retransmission of the common transmit signal vector, wherein each of the received signal vectors is associated with a channel state matrix;

concatenating the received signal vectors into a combined received signal vector;

concatenating each channel state matrix associated with the received signal vectors into a combined channel state matrix;

after the concatenations, matched filtering the combined received signal vector using the combined channel state matrix;

decision feedback equalizing the matched filtered combined received signal vector, wherein the decision feedback equalizing comprises incrementally computing a projected received signal, $\tilde{w}_n$, and a triangular matrix $\tilde{R}_n$ for an n-th transmission of the common transmit signal vector where $$\tilde{w}_n = \tilde{Q}_n^* \begin{bmatrix} \tilde{w}_{n-1} \\ y_n \end{bmatrix}, \tilde{H}_n = \begin{bmatrix} \tilde{R}_{n-1} \\ H_n \end{bmatrix},$$

and where a QR decomposition of the channel state matrix for the n-th transmission of the common transmit signal vector $\tilde{H}_n$ is given by $$\tilde{H}_n = \tilde{Q}_n \tilde{R}_n.$$

and where $H_1 = Q_1 R_1$, $\tilde{w}_1 = Q_1^* y_1$, and $y_n$ is the n-th received signal vector corresponding to the common transmit signal vector; and decoding an estimated transmit signal vector from the equalized combined received signal vector.

2. The method of claim 1 wherein decision the feedback equalizing comprises incrementally equalizing a received signal vector based on an equalization of previously received signal vectors.

3. The method of claim 1 wherein the decision feedback equalizing comprises:
feedforward filtering the matched filtered combined received signal vector; and
feedback filtering the feedforward filtered combined received signal vectors using a previous estimated transmit signal vector.

4. The method of claim 3 wherein:
the matched filtering comprises creating a matched filtered signal, $v_n$, where $$v_n = H_{c,n}^* y_{c,n}.$$

and where $H_{c,n}^*$ is a conjugate transpose of the combined channel state matrix and $y_{c,n}$ is the combined received signal vector after n signal vectors are received;
the feedforward filtering comprises creating a feedforward filter, $F_n$, where $$F_n = \Gamma_{c,n}^{-1} G_{c,n}^{-*}$$

and where $\Gamma_{c,n}$ is diagonal with positive elements and $G_{c,n}$ is upper triangular and monic calculated from $S_{c,n} = G_{c,n}^* \Gamma_{c,n} G_{c,n}$; where $S_{c,n}$ is an equivalent channel state matrix and $S_{c,n} = H_{c,n}^* H_{c,n}$; and
the feedback filtering comprises creating a feedback filter, $B_n$, where $$B_n = I - G_{c,n}$$

and where I is an identity matrix.

5. The method of claim 1 wherein decision the feedback equalizing comprises incrementally computing a matched filtered signal, $v_n$, and an equivalent combined channel state matrix, $S_{c,n}$, for an n-th transmission of the common transmit signal vector where $$v_n = v_{n-1} + H_n^* y_n$$

and $$S_{c,n} = S_{c,n-1} + H_n^* H_n$$

and where $v_0 = 0$, $S_0 = 0$, $y_n$ is the n-th received signal vector corresponding to the common transmit signal vector, and $H_n$ corresponds to the channel state matrix for the n-th transmission of the common transmit signal vector.

6. The method of claim 1 wherein decision the feedback equalizing comprises:

QR-decomposing the combined channel state matrix;
projecting the combined received signal vector onto a vector space of the QR-decomposed combined channel state matrix;
feedforward filtering the projected combined received signal vector; and
feedback filtering the feedforward filtered combined received signal vectors using a previous estimated transmit signal vector.

7. The method of claim 6 wherein the QR-decomposing the combined channel state matrix uses $$H_{c,n} = Q_{c,n} R_{c,n},$$

and where $H_{c,n}$ is the combined channel state matrix, $Q_{c,n}$ is a unitary matrix, and $R_{c,n}$ is an upper triangular matrix.

8. The method of claim 7 wherein:
the projecting the combined received signal vector comprises creating a projected signal, $w_n$, where $$w_n = Q_{c,n}^* y_{c,n}.$$

and where $y_{c,n}$ is the combined received signal vector after n signal vectors are received;
the feedforward filtering comprises creating a feedforward filter, $K_n$, where $$K_n = [\text{diag}(R_{c,n})]^{-1},$$

and where $\text{diag}(R_{c,n})$ denotes a diagonal matrix whose elements are equal to the diagonal elements of $R_{c,n}$; and
the feedback filtering comprises creating a feedback filter, $B_n$, where $$B_n = I - K_n R_{c,n}.$$

and where I is an identity matrix.

9. The method of claim 1 further comprising ordering the decision feedback equalizing by modifying the order of the combined channel state matrix.

10. A method for decoding a signal vector in a multiple-input multiple-output (MIMO) hybrid automatic repeat request (HARQ) transmission scheme, comprising:
receiving multiple signal vectors corresponding to a common transmit signal vector, wherein each of the received signal vectors is associated with a channel state matrix;
decision feedback equalizing each of the received signal vectors using an associated channel state matrix, wherein the decision feedback equalizing comprises incrementally computing a projected received signal, $\tilde{w}_n$, and a triangular matrix $\tilde{R}_n$ for an n-th transmission of the common transmit signal vector where $$\tilde{w}_n = \tilde{Q}_n^* \begin{bmatrix} \tilde{w}_{n-1} \\ y_n \end{bmatrix}, \tilde{H}_n = \begin{bmatrix} \tilde{R}_{n-1} \\ H_n \end{bmatrix},$$

and where a QR decomposition of the channel state matrix for the n-th transmission of the common transmit signal vector $\tilde{H}_n$ is given by $$\tilde{H}_n = \tilde{Q}_n \tilde{R}_n.$$

and where $H_1 = Q_1 R_1$, $\tilde{w}_1 = Q_1^* y_1$, and $y_n$ is the n-th received signal vector corresponding to the common transmit signal vector;
maximal ratio combining the equalized received signal vectors; and
decoding an estimated transmit signal vector from the combined equalized received signal vectors.

11. The method of claim 10 wherein the decision feedback equalizing each of the received signal vectors using the associated channel state matrix comprises computing a Cholesky factorization of the associated channel state matrix.

12. The method of claim 10 wherein the decision feedback equalizing each of the received signal vectors using the associated channel state matrix comprises computing a QR decomposition of the associated channel state matrix.

13. The method of claim 10 further comprising modifying the order of the combined equalized received signal vectors.

14. The method of claim 10 wherein the equalizing, the combining, and the decoding comprise:
equalizing each component of a first received signal vector;
combining each equalized component of the first received signal vector;
decoding a first estimated transmit signal vector from the combined equalized first received signal vector;
equalizing each component of a second received signal vector based on the first estimated transmit signal vector;
combining each equalized component of the second received signal vector; and
decoding a second estimated transmit signal vector from the combined equalized second received signal vector.

15. The method of claim 14 further comprising equalizing each component of a further received signal vector based on a previously estimated transmit signal vector, combining the components of the equalized further received signal vector, and decoding a new estimated transmit signal vector from the combined equalized further received signal vector.

16. A system for decoding a signal vector in a multiple-input multiple-output (MIMO) hybrid automatic repeat request (HARQ) transmission scheme, the system comprising:
a receiver that:
receives multiple signal vectors corresponding to multiple asynchronous transmissions of a common transmit signal vector, the received signal vectors comprising a first signal vector corresponding to a transmission of the common transmit signal vector and a second signal vector corresponding to a retransmission of the common transmit signal vector, wherein each of the received signal vectors is associated with a channel state matrix, and
concatenates the received signal vectors into a combined received signal vector and concatenates each channel state matrix associated with the received signal vectors into a combined channel state matrix;
a matched filter that, after the concatenations, filters the combined received signal vector using the combined channel state matrix;
a decision feedback equalizer that equalizes the matched filtered combined received signal vector, wherein the decision feedback equalizer incrementally computes a projected received signal, $\tilde{w}_n$, and a triangular matrix $\tilde{R}_n$ for an n-th transmission of the common transmit signal vector where $$\tilde{w}_n = \tilde{Q}_n^* \begin{bmatrix} \tilde{w}_{n-1} \\ y_n \end{bmatrix}, \tilde{H}_n = \begin{bmatrix} \tilde{R}_{n-1} \\ H_n \end{bmatrix},$$

and where a QR decomposition of the channel state matrix for the n-th transmission of the common transmit signal vector $\tilde{H}_n$ is given by $$\tilde{H}_n = \tilde{Q}_n \tilde{R}_n.$$

and where $H_1 = Q_1 R_1$, and $y_n$ is the n-th received signal vector corresponding to the common transmit signal vector; and
a decoder that decodes an estimated transmit signal vector from the equalized combined received signal vector.

17. The system of claim 16 wherein the decision feedback equalizer incrementally equalizes a received signal vector based on an equalization of previously received signal vectors.

18. The system of claim 16 wherein the decision feedback equalizer comprises:
a feedforward filter that filters the matched filtered combined received signal vector; and
a feedback filter that filters the feedforward filtered combined received signal vectors using a previous estimated transmit signal vector.

19. The system of claim 18 wherein:
the matched filter creates a matched filtered signal, $v_n$, where $$v_n = H_{c,n}^* y_{c,n}.$$

and where $H_{c,n}^*$ is a conjugate transpose of the combined channel state matrix and $y_{c,n}$ is the combined received signal vector after n signal vectors are received;
the feedforward filter creates a feedforward filter, $F_n$, where $$F_n = \Gamma_{c,n}^{-1} G_{c,n}^{-*}$$

and where $\Gamma_{c,n}$ is diagonal with positive elements and $G_{c,n}$ is upper triangular and monic calculated from $S_{c,n} = G_{c,n}^* \Gamma_{c,n} G_{c,n}$ where $S_{c,n}$ is an equivalent channel state matrix and $S_{c,n} = H_{c,n}^* H_{c,n}$; and
the feedback filter creates a feedback filter, $B_n$, where $$B_n = I - G_{c,n}$$

and where I is an identity matrix.

20. The system of claim 16 wherein the decision feedback equalizer incrementally computes a matched filtered signal, $v_n$, and an equivalent combined channel state matrix, $S_{c,n}$, for an n-th transmission of the common transmit signal vector where $$v_n = v_{n-1} + H_n^* y_n$$

and $$S_{c,n} = S_{c,n-1} + H_n^* H_n$$

and where $v_0 = 0$, $S_0 = 0$, $y_n$ is the n-th received signal vector corresponding to the common transmit signal vector, and $H_n$ corresponds to the channel state matrix for the n-th transmission of the common transmit signal vector.

21. The system of claim 16 wherein the decision feedback equalizer:
QR-decomposes the combined channel state matrix;
projects the combined received signal vector onto a vector space of the QR-decomposed combined channel state matrix;
feedforward filters the projected combined received signal vector; and
feedback filters the feedforward filtered combined received signal vectors using a previous estimated transmit signal vector.

22. The system of claim 21 wherein the QR-decomposing the combined channel state matrix uses $$H_{c,n} = Q_{c,n} R_{c,n},$$

and where $H_{c,n}$ is the combined channel state matrix, $Q_{c,n}$ is a unitary matrix, and $R_{c,n}$ is an upper triangular matrix.

23. The system of claim 22 wherein:
the projecting the combined received signal vector comprises creating a projected signal, $w_n$, where $$w_n = Q_{c,n}^* y_{c,n}.$$

and where $y_{c,n}$ is the combined received signal vector after n signal vectors are received;
the feedforward filtering comprises creating a feedforward filter, $K_n$, where $$K_n = [\text{diag}(R_{c,n})]^{-1},$$

and where $\text{diag}(R_{c,n})$ denotes a diagonal matrix whose elements are equal to the diagonal elements of $R_{c,n}$; and
the feedback filtering comprises creating a feedback filter, $B_n$, where $$B_n = I - K_n R_{c,n}.$$

and where I is an identity matrix.

24. The system of claim 16 wherein the decision feedback equalizer modifies the order of the combined channel state matrix.

25. A system for decoding a signal vector in a multiple-input multiple-output (MIMO) hybrid automatic repeat request (HARQ) transmission scheme, the system comprising:
a receiver that receives multiple signal vectors corresponding to a common transmit signal vector, wherein each of the received signal vectors is associated with a channel state matrix;
decision feedback equalizer that equalizes each of the received signal vectors using an associated channel state matrix, wherein the decision feedback equalizer incrementally computes a projected received signal, $\tilde{w}_n$, and a triangular matrix $\tilde{R}_n$ for an n-th transmission of the common transmit signal vector where $$\tilde{w}_n = \tilde{Q}_n^* \begin{bmatrix} \tilde{w}_{n-1} \\ y_n \end{bmatrix}, \tilde{H}_n = \begin{bmatrix} \tilde{R}_{n-1} \\ H_n \end{bmatrix},$$

and where a QR decomposition of the channel state matrix for the n-th transmission of the common transmit signal vector $\tilde{H}_n$ is given by $$\tilde{H}_n = \tilde{Q}_n \tilde{R}_n.$$

and where $H_1 = Q_1 R_1$, $\tilde{w}_1 = Q_1^* y_1$, and $y_n$ is the n-th received signal vector corresponding to the common transmit signal vector;
a maximal ratio combiner that combines the equalized received signal vectors; and
a decoder that determines an estimated transmit signal vector from the combined equalized received signal vectors.

26. The system of claim 25 wherein the decision feedback equalizer equalizes each of the received signal vectors using a Cholesky factorization of the associated channel state matrix.

27. The system of claim 25 wherein the decision feedback equalizer equalizes each of the received signal vectors using a QR decomposition of the associated channel state matrix.

28. The system of claim 25 wherein the decision feedback equalizer incrementally equalizes a received signal vector based on an equalization of previously received signal vectors.

29. The system of claim 25 wherein the order of the combined equalized received signal vector is modified prior to decoding.

30. The system of claim 25 wherein the equalizer, the combiner, and the decoder are operative to:
equalize each component of a first received signal vector;
combine each equalized component of the first received signal vector;
decode a first estimated transmit signal vector from the combined equalized first received signal vector;
equalize each component of a second received signal vector based on the first estimated transmit signal vector;
combine each equalized component of the second received signal vector; and
decode a second estimated transmit signal vector from the combined equalized second received signal vector.

31. The system of claim 30 further operative to equalize each component of a further received signal vector based on a previously estimated transmit signal vector, combine the components of the equalized further received signal vector, and decode a new estimated transmit signal vector from the combined equalized further received signal vector.

* * * * *